(12) United States Patent
Urushihara et al.

(10) Patent No.: US 7,951,465 B2
(45) Date of Patent: May 31, 2011

(54) JOINED BODY OF DISSIMILAR MATERIALS COMPRISING STEEL MATERIAL AND ALUMINUM MATERIAL, AND JOINING METHOD THEREFOR

(75) Inventors: Wataru Urushihara, Kobe (JP); Mikako Takeda, Kobe (JP); Katsushi Matsumoto, Kobe (JP); Jun Katoh, Kobe (JP); Yasuaki Sugizaki, Kobe (JP); Hidekazu Ido, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 784 days.

(21) Appl. No.: 11/578,406

(22) PCT Filed: Apr. 20, 2005

(86) PCT No.: PCT/JP2005/007554
§ 371 (c)(1),
(2), (4) Date: Oct. 13, 2006

(87) PCT Pub. No.: WO2005/102586
PCT Pub. Date: Nov. 3, 2005

(65) Prior Publication Data
US 2007/0212565 A1    Sep. 13, 2007

(30) Foreign Application Priority Data

Apr. 21, 2004  (JP) ................. 2004-125931
Apr. 28, 2004  (JP) ................. 2004-133985
Nov. 22, 2004  (JP) ................. 2004-337795
Mar. 29, 2005  (JP) ................. 2005-095280

(51) Int. Cl.
*B32B 7/04*  (2006.01)
*B32B 15/18*  (2006.01)
*B32B 15/20*  (2006.01)
*B23K 9/007*  (2006.01)

(52) U.S. Cl. ........ 428/572; 428/653; 428/681; 219/136; 219/137 R

(58) Field of Classification Search ................. None
See application file for complete search history.

(56) References Cited

U.S. PATENT DOCUMENTS
5,783,794 A    7/1998  Oikawa et al.
(Continued)

FOREIGN PATENT DOCUMENTS
JP    4 55066    2/1992
(Continued)

OTHER PUBLICATIONS

H. Oikawa, et al., "Spot Welding of Aluminum Clad Steel to Steel or Aluminium: Joining Steel to Aluminium With an Intermediate Layer ($1^{ST}$ Report)", Welding International, XP 000593542, vol. 10, No. 7, Jan. 1996, pp. 530-542.

(Continued)

*Primary Examiner* — Jennifer C McNeil
*Assistant Examiner* — Jason L Savage
(74) *Attorney, Agent, or Firm* — Oblon, Spivak, McClelland, Maier & Neustadt, L.L.P.

(57) ABSTRACT

To provide a steel-aluminum welded material and a spot welding method therefor having high weld strength.
The steel-aluminum welded material 3 includes a steel material 1 and an aluminum material 2 having predetermined widths. The area of a nugget 5 of a spot-welded part is determined as a function of the thickness of the aluminum material 2, and the area of a part of the nugget 5 corresponding to a part having a thickness in a range between 0.5 and 10 μm of an interface reaction layer 6 is defined as a function of the thickness of the aluminum material 2.

19 Claims, 8 Drawing Sheets

U.S. PATENT DOCUMENTS

| | | | |
|---|---|---|---|
| 6,037,559 | A | 3/2000 | Okabe et al. |
| 6,216,557 | B1 | 4/2001 | Ishiuchi et al. |
| 2006/0275623 | A1 | 12/2006 | Takeda et al. |

FOREIGN PATENT DOCUMENTS

| | | |
|---|---|---|
| JP | 4 143083 | 5/1992 |
| JP | 4 251676 | 9/1992 |
| JP | 5 111776 | 5/1993 |
| JP | 5 228643 | 9/1993 |
| JP | 6-39558 | 2/1994 |
| JP | 6 63763 | 3/1994 |
| JP | 6-63764 | 3/1994 |
| JP | 7 24581 | 1/1995 |
| JP | 7 178563 | 7/1995 |
| JP | 7 328774 | 12/1995 |
| JP | 8-28212 | 1/1996 |
| JP | 9 174249 | 7/1997 |
| JP | 9-225648 | 9/1997 |
| JP | 2003-145278 | 5/2003 |
| JP | 2003 145278 | 5/2003 |
| JP | 2004 17148 | 1/2004 |

OTHER PUBLICATIONS

Wolfgang Beyer, et al., "Joining Steel and Aluminium by Resistance Spot Welding (Widerstandspunktschweissen Der Kombination Stahl- Aluminium)", Schweisstechnik, XP 008085538, vol. 20, No. 11, Nov. 1970, pp. 493-497.

Friedrich Eichhorn, et al., "Resistance Spot Welding of Aluminium and Steel", Schweissen Und Schneiden, XP 008085592, vol. 34, No. 1, Jan. 1982, pp. 15-20.

Notificaton of Reasons for Refusal, Dispatch Date Dec. 14, 2010, Issued in JP 2003-396052, filed Nov. 26, 2003.

Takashi Nakamura, et al., "Gendai Yosetsu Gijutsu Taikei", Sanpo Shuppan Kabushiki Kaisha, vol. 8, pp. 27-28, 1980. (with partial English translation).

U.S. Appl. No. 12/280,599, filed Aug. 25, 2008, Urushihara, et al.

MEASURED TEMPERATURE VARIATION

EXAMPLE No.18

EXAMPLE No.1

EXAMPLE No.25

EXAMPLE No.13

JOINED BODY OF DISSIMILAR MATERIALS COMPRISING STEEL MATERIAL AND ALUMINUM MATERIAL, AND JOINING METHOD THEREFOR

TECHNICAL FIELD

The present invention relates to a steel-aluminum welded material formed by welding together a steel material and an aluminum material for making parts of transport equipment including automobiles and rolling stock, machine parts and architectural structures, and a steel-aluminum welded material fabricating method.

BACKGROUND ART

Generally, spot welding is used for welding together members of the same metal. Spot welding will contribute greatly to weight reduction of material, provided that members respectively of different metals, such as an aluminum member and an iron-base member can be welded together by spot welding. The term "aluminum" is used for designating pure aluminum and aluminum alloys, and the term "steel" will be used instead of "iron-base" in this specification.

A brittle intermetallic compound is likely to be produced in the joint of a steel material and an aluminum material when the steel and the aluminum material are welded together and consequently, it has been very difficult to form a reliable, very strong joint, namely, a joint having high weld strength. Therefore, bolts and rivets have been used for welding together members respectively of different metals. However, joints formed by using bolts or rivets have problems in reliability, air tightness and cost.

Many studies have been made of spot welding methods of fabricating welded materials each formed by welding together materials respectively of different qualities. Methods that insert an aluminum-steel clad material or a steel pad between a steel material and an aluminum material are proposed in Patent documents 1, 2, 3 and 4. Methods that plate a steel material with a metal having a low melting point or insert a sheet of a metal having a low melting point between a steel material and an aluminum material are proposed in Patent documents 5, 6 and 7. A method proposed in patent document 8 sandwiches insulating particles between a steel material and an aluminum material. A method proposed in Patent document 9 forms irregularities in material. A method proposed in Patent document 10 forms nuggets in the interface between a steel plate and an aluminum alloy plate so as to be biased toward the positive pole, namely, the aluminum alloy plate, by the agency of a polarity effect.

| [Patent document 1] | JP-A No. H6-63763 |
| [Patent document 2] | JP-A No. H7-178563 |
| [Patent document 3] | JP-A No. H4-55066 |
| [Patent document 4] | JP-A No. H7-328774 |
| [Patent document 5] | JP-A No. H4-251676 |
| [Patent document 6] | JP-A No. H7-24581 |
| [Patent document 7] | JP-A No. H4-143083 |
| [Patent document 8] | JP-A No. H5-228643 |
| [Patent document 9] | JP-A No. H9-174249 |
| [Patent document 10] | JP-A No. H5-111776 |

Disclosure of the Invention

Problem to be Solved by the Invention

Those previously proposed methods need an additional process, such as a multilayer spot welding process and a plating process instead of a simple spot welding process. Therefore, additional equipment needs to be added to an existing welding line, which increases welding cost. Those previously proposed methods place restrictions on welding conditions and require difficult work. Many problems, such as the possibility of stably forming joints having high weld strength in satisfactory repeatability and the reduction of weld strength due to the reduction of the thickness of the aluminum material resulting from increases in welding heat input, still reside in those methods.

Suppression of the cracking of a nugget, as well as the strength of a nugget, is an important requirement for spot welding. None of the previously proposed methods deals with the cracking of a nugget.

The present invention has been made to solve those problems and it is therefore an object of the present invention to provide a steel-aluminum welded material having high weld strength and capable of being made by spot welding without using any additional materials, such as a clad plate, and without requiring additional processes and to provide a spot welding method for fabricating the steel-aluminum welded material. Another object of the present invention is to provide a steel-aluminum welded material having joints having high weld strength and capable of being stably formed in satisfactory repeatability without causing troubles, such as increase in the reduction of the thickness of the aluminum material, by spot welding and to provide a spot welding method for fabricating the steel-aluminum welded material. A third object of the present invention is to provide a spot welding method that will not cause the cracking of nuggets.

Means for Solving the Problem

The inventors of the present invention made studies and acquired the following knowledge and have made the present invention on the basis of the acquired knowledge.

Generally, welding together materials of the same quality, such as steel material or aluminum material, by high weld strength by spot welding can be achieved by promoting the formation of nuggets. It is known that the larger the area of nuggets, the higher both the tensile shear strength and the cross tensile strength of the welded material. The area of a nugget is dependent on heat input; the area of a nugget is larger when heat input is larger or weld time is longer. Therefore, a welded material having high weld strength is obtained, in general, by adjusting the diameter of a nugget through the control of heat input during spot welding. It is important to form a nugget having a proper area because the material is melted to its surface and splash occurs if a nugget having an excessively large area is formed.

When a steel material and an aluminum material are welded together, the amount of heat generated in the steel material is larger than that generated in the aluminum material because the steel material has a melting point and an electrical resistance higher than those of the aluminum material. Consequently, the aluminum material having a low melting point melts first, and then a surface of the steel material melts. Consequently, a brittle Al—Fe intermetallic compound layer is formed between the steel material and the aluminum material. It is known that the intermetallic compound layer formed by spot welding a steel material and an aluminum material consists of two layers; namely, an $Al_5Fe_2$ compound layer on the side of the steel material and a compound layer containing, as a principal component, $Al_3Fe$ or $Al_{19}Fe_4Si_2Mn$ on the side of the aluminum material. Those intermetallic compounds are very brittle and hence the steel material and the aluminum material cannot be welded together by high weld strength.

If the aluminum material melts to its surface and splash occurs, the thickness of the aluminum material decreases and a joint having high weld strength cannot be formed. Whereas a high heat input is needed to form a nugget in a proper diameter to weld together a steel material and an aluminum material, namely, materials respectively of different metals, by a high weld strength by spot welding, it is necessary to suppress the formation of a interface reaction layer in the interface, to limit the melting depth of the steel material to the least extent and to suppress the occurrence of splash to the least extent.

A nugget of a large area can be formed and the occurrence of splash can be suppressed when a high welding current is supplied for a short time. Such a welding mode can suppress the melting of the steel material in the interface and can reduce the thickness of the interface reaction layer and can enhance weld strength. Although a nugget of a large area can be formed, the reduction of the thickness of the aluminum material increases due to splash if welding is continued for a long time. Moreover, the steel material is melted greatly in the interface, a thick interface reaction layer is formed and hence weld strength is low.

When a high welding current is used to increase current density, significant splash occurs with a steel material of some steel and a thick interface reaction layer is formed. Although weld strength increases with the increase of welding current, there is a limit to the increase of weld strength. When a nugget having a maximum weld strength is subject to a cross tensile strength test, interfacial fracture occurs at a test force not higher than 1.0 kN/spot and the aluminum material does not break.

Differing from usual knowledge that a thinner interface reaction layer is desirable, it was found that an interface reaction layer of a thickness in an optimum thickness range is desirable and it is important to form an interface reaction layer of a thickness in the optimum thickness range in a large area. The inventors of the present invention understood that the thickness and structure of an interface reaction layer in the interface between a steel material and an aluminum material need to be adjusted to weld together the steel material and the aluminum material by high weld strength.

The effect of the thickness of the interface reaction layer on weld strength was studied and it was found that the weld strength is high even if the interface reaction layer consists of a compound layer of $Al_5Fe_2$ on the side of the steel material and a compound layer of $Al_3Fe$ and $Al_{19}Fe_4Si_2Mn$ on the side of the aluminum material, provided that the relation between the compound layer of $Al_5Fe_2$ and the compound layer of $Al_3Fe$ and $Al_{19}Fe_4Si_2Mn$ in thickness and area meets conditions in an optimum range. The present invention has been made on the basis of such a finding.

More concretely, it was found that the weld strength can be greatly enhanced when the thickness of the compound layer of $Al_3Fe$ and $Al_{19}Fe_4Si_2Mn$ on the side of the aluminum material relative to the compound layer of $Al_5Fe_2$ is adjusted so as to be in an optimum thickness range and the compound layer of $Al_3Fe$ and $Al_{19}Fe_4Si_2Mn$ of a thickness in the optimum thickness range is formed in a large area.

The inventors of the present invention found that the composition of the interface reaction layer is dependent on the respective qualities of the steel material and the aluminum material and studied the effect of the composition of the interface reaction layer on the weld strength. It was found through studies that Mn and Si contribute to the improvement of the strength of the interface reaction layer. It was found that the Mn content and the Si content of the steel material and the Si content of the aluminum material are closely related with the weld strength and that the strength of an interface reaction layer formed by spot welding increases remarkably when the Mn content and the Si content of the interface reaction layer are adjusted relative to the Mn content and the Si content of the steel material and the Si content of the aluminum material.

The present invention provides a steel-aluminum welded material formed by welding together a steel material having a thickness $t_1$ in a range between 0.3 and 2.5 mm and an aluminum material having a thickness $t_2$ in a range between 0.5 and 2.5 mm by spot welding, wherein nuggets formed in spot welded parts have an area in a range between $20\, t_2^{0.5}$ and $70\, t_2^{0.5}$ mm$^2$, and a part of each nugget corresponding to a part having a thickness in a range between 0.5 and 10.5 μm of an interface reaction layer is $10\, t_2^{0.5}$ mm$^2$ or above.

In the steel-aluminum welded material according to the present invention, it is preferable that the interface reaction layer includes a compound layer of $Al_5Fe_2$ on the side of the steel material and a compound layer of $Al_3Fe$ and $Al_{19}Fe_4Si_2Mn$ on the side of the aluminum material, and a part of the compound layer of $Al_3Fe$ and $Al_{19}Fe_4Si_2Mn$ corresponding to a central part of the each nugget has a mean thickness along the depth of the nuggets in a range between 0.5 and 10 μm. Preferably, a part of the compound layer of $Al_5Fe_2$ having a mean thickness along the depth of the nugget in a range between 0.5 and 5 μm has an area of $10\, t_2^{0.5}$ mm$^2$ or above. Preferably, a part of the compound layer of $Al_5Fe_2$ corresponding to a central part of the nugget has a mean thickness along the depth of the nugget in a range between 0.5 and 5 μm. Preferably, a middle part with respect to thickness of the interface reaction layer has a Mn content 1.5 times that of the steel material and a Si content 1.1 times that of the aluminum material and 1.1 times that of the steel material. Preferably, the steel material has a C content in a range between 0.05 and 0.5%, a Mn content in a range between 0.5 and 3% and a Si content in a range between 0.02 and 2.0% and the aluminum material has a Si content in a range between 0.4 and 2%.

In the steel-aluminum welded material according to the present invention, a joining surface of the steel material or the aluminum material may be coated beforehand by plating with a Zn and/or Al film having a thickness in a range between 3 and 15 μm and a melting point in a range between 350 and 950° C.

The present invention provides a spot welding method of fabricating a steel-aluminum welded material by welding together a steel material having a thickness $t_1$ in a range between 0.3 and 2.5 mm and an aluminum material having a thickness $t_2$ in a range between 0.5 and 2.5 mm by spot welding using electrode tips each having a rounded end of a diameter of 7 mm or above and a radius R of curvature of 75 mm or above, applying a pressure in a range between $2\, t_2^{0.5}$ and $4\, t_2^{0.5}$ kN to the superposed steel material and the aluminum material with the electrode tips and supplying a welding current in a range between $15\, t_2^{0.5}$ and $30\, t_2^{0.5}$ kA for $100\, t_2^{0.5}$ ms or below. Preferably, each of the electrode tips has a rounded end of a diameter of 7 mm or above and a radius R of curvature of 120 mm or above, a pressure in a range between $2.5\, t_2^{0.5}$ and $4\, t_2^{0.5}$ kN is applied to the superposed steel material and the aluminum material with the electrode tips and a welding current in a range between $18\, t_2^{0.5}$ and $30\, t_2^{0.5}$ kA is supplied for a time of $100\, t_2^{0.5}$ ms or below.

When a joining surface of the steel material or the aluminum material is coated beforehand by plating with a Zn and/or Al film having a thickness in a range between 3 and 15 μm and a melting point in a range between 350° C. and 950° C., the spot welding method according to the present invention uses the electrode tips each having a rounded end of a diameter of 7 mm or above and a radius R of curvature of 75 mm or above, and includes a plurality of welding processes including at least two spot welding processes differing from each other in welding current and/or weld time, one of the two spot welding processes is a high-current spot welding process that applies a pressure in a range between $2\,t_2^{0.5}$ and $4\,t_2^{0.5}$ kN to the superposed steel material and the aluminum material with the electrode tips and supplies a welding current in a range between $15\,t_2^{0.5}$ and $30\,t_2^{0.5}$ kA to form a nugget having an area in a range between $20\,t_2^{0.5}$ and $70\,t_2^{0.5}$ mm$^2$ and the other one of the two spot welding processes is a low-current spot welding process, subsequent to the high-current spot welding process, that applies a pressure in a range between $2\,t_2^{0.5}$ and $4\,t_2^{0.5}$ kN to the superposed steel material and the aluminum material with the electrode tips and supplies a welding current in a range between $t_2^{0.5}$ and $10\,t_2^{0.5}$ kA for a weld time in a range between $100\,t_2^{0.5}$ and $1000\,t_2^{0.5}$ ms.

The present invention provides a spot welding method of fabricating a steel-aluminum welded material by welding together a steel material having a thickness $t_1$ in a range between 0.3 and 2.5 mm and an aluminum material having a thickness $t_2$ in a range between 0.5 and 2.5 mm by spot welding, wherein a welding current at the end of current supply is lower than a welding current at the start of current supply. Preferably, the welding current at the end of current supply is controlled such that the temperature of a nugget formed in the aluminum material drops from 600° C. to 200° C. at a mean cooling rate of 2500° C./s or below and the smallest thickness of the nugget in a section of a weld zone meets a condition expressed by Expression (1).

(Smallest thickness of the nugget)/(Thickness of the aluminum material)$\geq 0.3$     (1)

DISCLOSURE OF THE INVENTION

According to the present invention, when the steel-aluminum welded material is formed by spot welding, the interface reaction layer of a thickness in the optimum thickness range can be formed in a large area on the side of the aluminum material and nuggets having a large area can be formed. Consequently, the steel-aluminum welded material has a high weld strength. Since the Mn and the Si content of the interface reaction layer are adjusted, the steel-aluminum welded material having a high weld strength can be formed by spot welding without using additional materials and without requiring additional processes.

REFERENCE CHARACTERS

1: Steel material, 2: Aluminum alloy sheet, 3: Steel-aluminum welded material, 4: Oxide film, 5: Nugget, 6: Boundary reaction layer, 7 and 8: electrodes and 40: Deposited film

BEST MODE FOR CARRYING OUT THE INVENTION

Steel-Aluminum Welded Material

Figure 1:
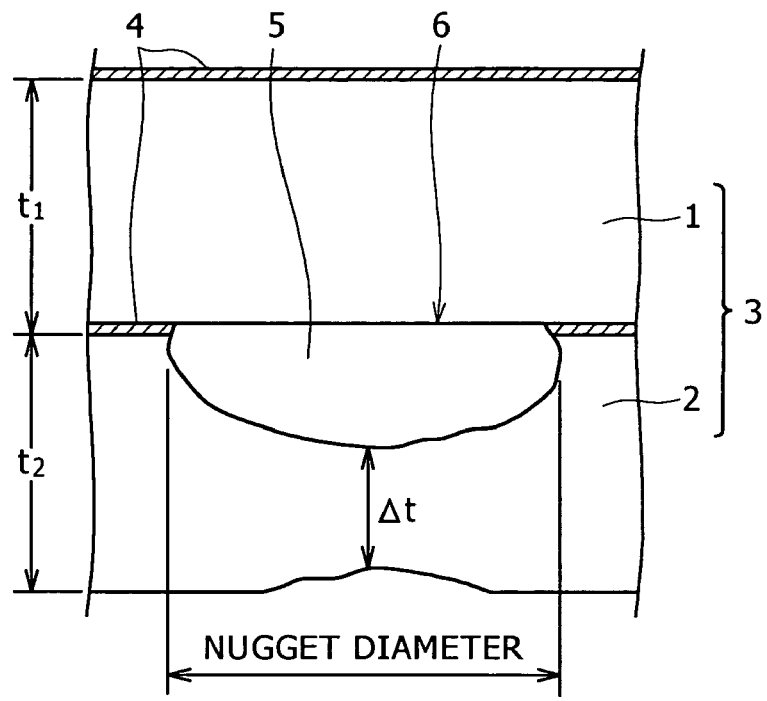
FIG. 1 is a sectional view of a steel-aluminum welded structure in a first embodiment according to the present invention.

FIG. 1 shows a steel-aluminum welded material in a preferred embodiment according to the present invention in a sectional view. As shown in FIG. 1, the steel-aluminum welded structure is formed by welding together a steel material 1, namely, a steel material, and an aluminum material 2, namely, an aluminum alloy sheet, by spot welding. Surfaces of the steel material 1 are coated with oxide films 4, respectively. A nugget 5 has a weld interface surface 6, namely, interface reaction layer, formed by spot welding. A horizontal dimension line in FIG. 1 indicates the diameter of the nugget 5. In FIG. 1, $t_1$ indicates the thickness of the steel material 1, $t_2$ indicates the thickness of the aluminum material 2 and $\Delta t$ indicates the smallest thickness of a remaining part of the aluminum material after spot welding. FIG. 1 shows a joint having a nugget of a desired diameter formed by suppressing splash. A welded material according to the present invention has a joint as shown in FIG. 1.

Figure 2:
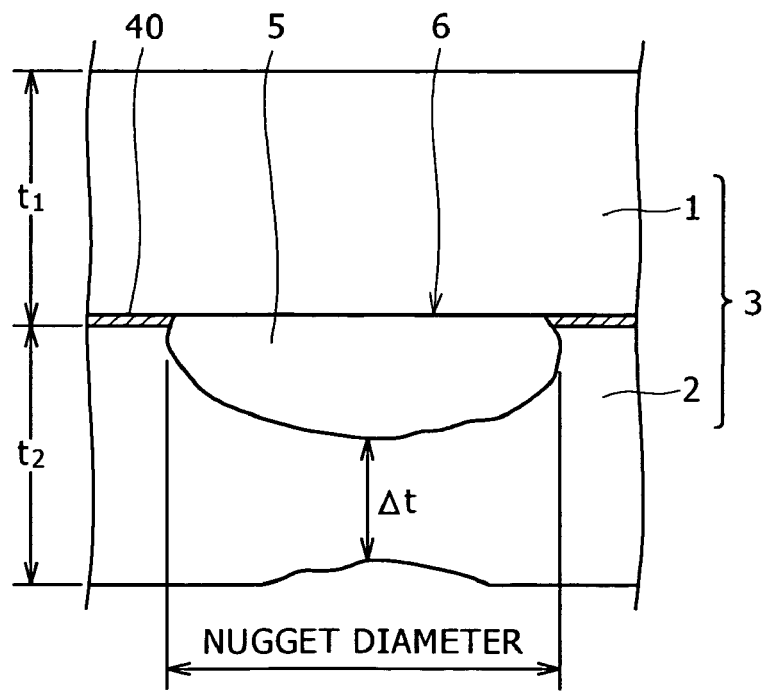
FIG. 2 is a sectional view of a steel-aluminum welded structure in a second embodiment according to the present invention.

FIG. 2 shows a steel-aluminum welded structure in a second embodiment according to the present invention in a sectional view. A steel-aluminum welded material 3 shown in FIG. 2 is formed by welding together a steel material 1, namely, a steel material, and an aluminum material 2, namely, an aluminum alloy sheet, by spot welding. The steel-aluminum welded material 3 shown in FIG. 2 is identical with the steel-aluminum welded material 3 shown in FIG. 1, except that a joining surface of the steel material 1 shown in FIG. 2 is coated beforehand with a deposited film 40. The deposited film 40 may be formed at least on the joining surface, namely, one of the surfaces, of either of the steel material and the aluminum material or may be formed on the joining surface and the outer surface, namely, both the surfaces, of either of the steel material and the aluminum material.

Necessary conditions of the present invention and functions thereof will be explained.

Thickness of Steel Material

The steel material of the steel-aluminum welded material of the present invention needs to have a thickness $t_1$ in a range between 0.3 and 2.5 mm. Strength and rigidity of a steel material having a thickness $t_1$ below 0.3 mm are insufficient for structural members and structural materials. More over, such an excessively thin steel material is deformed greatly when pressure is applied thereto for spot welding, the oxide film is easily damaged and, therefore, a reaction between the steel material and the aluminum material is promoted. Consequently, an intermetallic compound is likely to be produced. In the case a steel material has a thickness greater than 2.5 mm, a different joining means for forming structural members and structural materials is used, so such a material does not need to be welded to another material by spot welding. Therefore, the thickness $t_1$ of the steel material does not need to be greater than 2.5 mm.

Tensile Strength of Steel Material

There are not particular restrictions on the shape and quality of the steel material. The steel material may be of any proper shape and any proper quality, such as a steel material, a steel shape or a steel pipe generally used for forming structural members. Preferably, the steel material has a tensile strength of 400 MPa or above. Generally, most low alloy steels have low strength and most of oxide films are those of oxides of iron. Therefore, Fe and Al diffuse easily and a brittle intermetallic compound is likely to be produced. Thus it is preferable that the steel material has a high tensile strength, desirably, a tensile strength of 400 MPa or above.

Although the present invention does not place limitative conditions on the composition of the steel material, it is preferable that the steel material meeting the foregoing condition on strength is a high-tension steel material. Steels selectively containing Cr, Mo, V and Ti in addition to C may be used to provide the steel material with high hardenability and precipitation hardenability. Elements Cr, Mo and Nb enhance hardenability and strength, elements V and Ti promote precipitation hardening to enhance strength. However, the toughness of a part around a weld zone decreases and an easily cracking nugget is formed if the steel material contains those alloying elements in an excessively high content. Thus the steel of the steel material has a basic composition having a C content in a range between 0.05 and 0.5% (percent by mass unless otherwise specified), a Mn content in a range between 0.5 and 3.0%, a Si content in a range between 0.02 and 2.0%. Preferably, the steel of the steel material selectively contains, when necessary, one or two or more of elements including Cr, Mo, Nb, V and Ti in a Cr content in a range between 0 to 1%, a Mo content in a range between 0 and 0.2%, a Nb content in a range between 0 and 0.1%, a V content in a range between 0 and 0.1% and a Ti content in a range between 0 and 0.1%. Other elements contained in the steel material are Fe and unavoidable impurities.

Elements Mn and Si increase the Mn content and Si content of the interface reaction layer to desired content levels, respectively, and increase weld strength. It is conjectured that elements Mn and Si melt during welding, obstruct the diffusion of Fe and Al in the joining surface and suppress the production of a brittle intermetallic compound to the least extent. Elements Mn and Si contained in a high Mn content and a high Si content in the oxide film coating the surface of the steel material enhance the barrier effect of the oxide film to retard contact between molten aluminum melted by spot welding and the steel material.

Oxide Film on Steel Material

Preferably, the Mn content and the Si content of the oxide film 4 formed on the steel material are twice or above the Mn content and the Si content of the base metal of the steel material, respectively. Although the effects of Mn and Si contained in the oxide film are not elucidated, the oxide film formed on the surface of the steel material has a barrier effect of retarding contact between molten aluminum and the steel material. It is conjectured that the higher the Mn content and the Si content of the oxide film, the higher the barrier effect of the oxide film. It is conjectured that Mn and Si strengthen the oxide film and suppress the breakage of the oxide film by welding pressure.

It is conjectured that, when the oxide film is broken, Mn and Si contained in the oxide film melt, and molten Mn and Si obstruct the diffusion of Fe and Al in the joining surface and suppress the production of a brittle intermetallic compound to the least extent.

The foregoing effects of Mn and Si are insignificant and the weld strength enhancing effect is not remarkable when the Mn content and the Si content of the oxide film are less than twice the Mn content and the Si content of the steel material, respectively. The Mn content and the Si content of the oxide film are dependent on the Mn content and the Si content, respectively, of the steel material. It is desirable that the steel material has a high Mn content and a high Si content to increase the Mn content and the Si content of the oxide film. However, if the steel material has a high Mn content and a high Si content, the toughness of a part around a weld zone of the steel material is low and an easily cracked nugget is formed. Preferably, the steel material has a Mn content in a range between 1 and 2.5% and a Si content in a range between 0.5 and 1.5%.

Only the Mn content and the Si content of a surface layer of the steel material having a comparatively low Mn content and a comparatively low Si content may be increased to form an oxide film having a high Mn content and a high Si content. The Mn content and the Si content of the oxide film can be determined through the TEM-EDX analysis of a section of the steel material.

The thickness of the oxide film having a high Mn content and a high Si content may be in a range between about several tens nanometer and about 1 μm and the oxide film does not need to be excessively thick. An oxide film having a Mn content and a Si content specified by the present invention and having the foregoing thickness has the foregoing barrier effect. The oxide film of such a thickness and having such a composition does not affect welding adversely and can exercise the foregoing barrier effect. Spot welding capable of forming joints having a high weld strength can be achieved without requiring considerable change in conditions on the steel material and a material to be welded to the steel material and the method, by a comparatively simple means for adjusting the composition of the oxide film on the steel material.

Aluminum Sheet

There are not particular restrictions on the alloy and shape of the aluminum material according to the present invention. The aluminum material may be selected from generally used plates, shapes, forged material and cast material so as to meet the requisite properties of structural members. It is desirable that the aluminum material, similarly to the steel material, has high strength to suppress deformation under welding pressure used by spot welding. Optimum aluminum materials are those of the A5000 group and the A6000 group generally used for forming structural members.

Silicon (Si) contained in the aluminum material, similarly to Si contained in the steel material, increases the Si content of the interface reaction layer to a desired level and enhances weld strength. It is conjectured that Si melts during welding and obstructs the diffusion of Fe and Al and suppress the production of a brittle intermetallic compound to the least extent. Therefore, it is preferable that the aluminum material has a Si content in a range between 0.4 and 2%. Preferably, such a desirable aluminum material is selected from those of A6000 group.

The aluminum material to be used by the present invention has a thickness $t_2$ in a range between 0.5 and 2.5 mm. The strength of structural members made from the aluminum material is insufficient, a nugget having a proper area cannot be formed, the aluminum material melts easily to its surface and splash is liable to occur and hence joints having high weld strength cannot be formed if the thickness $t_2$ of the aluminum material is below 0.5 mm. Since joining means are used for forming structural members and structural materials, an aluminum material of a thickness greater than 2.5 mm does not need to be welded to another material by spot welding. Therefore, the thickness $t_2$ of the aluminum material does not need to be greater than 2.5 mm.

Area of Nugget

Preferably, the aluminum material and the steel material are joined together by spot welding such that the area of the nugget 5 in a spot welded part shown in FIG. 1 is in a range between $20 t_2^{0.5}$ and $70 t_2^{0.5}$ mm². In other words, it is necessary to determine spot welding conditions selectively so as to form a nugget having an area in a range between $20 t_2^{0.5}$ and $70 t_2^{0.5}$ mm².

When materials of the same metal having a thickness t are joined together by spot welding, it is a common knowledge that the nugget 5 having an area on the order of $20 t^{0.5}$ mm² is optimum from the viewpoint of strength, operation efficiency and economical effect. The present invention joins together materials of different metals by spot welding that form a nugget of an area larger than that of the optimum nugget to be formed when materials of different metals are joined together. Spot welding is performed so as to form the nugget 5 formed in a spot welded part may have an area in a range between $20 t_2^{0.5}$ and $70 t_2^{0.5}$ mm², where $t_2$ is the thickness of the aluminum material. Such spot welding can form joints having a sufficient weld strength and is excellent in operation efficiency and economical effect. When the materials of different metals are joined together according to the present invention, the optimum diameter of the nugget is dependent on the thickness of the aluminum material and the effect of the thickness of the steel material on the optimum diameter of the nugget is negligibly small.

The area of the nugget below $20 t_2^{0.5}$ mm², more strictly, below $30 t_2^{0.5}$ mm², is excessively small and weld strength is insufficient. The area of the nugget greater than $70 t_2^{0.5}$ mm² provides sufficient weld strength, but splash is liable to occur and the thickness of the aluminum material decreases greatly. Therefore the area of the nugget is in a range between $20 t_2^{0.5}$ and $70 t_2^{0.5}$ mm², preferably, a range between $30 t_2^{0.5}$ and $70 t_2^{0.5}$ mm².

Measurement of Area of Nugget

The area of the nugget formed by the present invention is determined through the measurement of the area of an interface surface in a steel-aluminum joint. A method of measuring the area of an interface surface in a steel-aluminum joint peels or cut off the aluminum material from the interface surface in the steel-aluminum joint and analyzes an image of the aluminum material to determine the area of the nugget. When the nugget has a substantially circular shape, the steel-aluminum joint may be cut, a section of the steel-aluminum joint may be examined with an optical microscope to measure diameters of the nugget in the interface surface and the area of the nugget may be calculated using the measured diameters. Diameters of the nugget in the interface surface along at least two perpendicular directions are measured.

Thickness of Boundary Reaction Layer

The area of a part having a thickness in a range between 0.5 and 10.5 μm of the interface reaction layer 6 on the nugget 5 shown in FIG. 1 is $10 t_2^{0.5}$ mm² or above. The area of the interface reaction layer having an optimum thickness is specified in view of weld strength. Contrary to common knowledge that a thinner interface reaction layer is desirable, the present invention forms the interface reaction layer in a thickness in an optimum thickness range. The intention of the present invention is to positively form an interface reaction layer rather than not forming one. The present invention is based on a technical idea of forming an interface reaction layer of a thickness in an optimum thickness range in a large area; that is, an interface reaction layer is formed in a wide range.

A interface reaction layer of a thickness in an optimum thickness range cannot be formed and weld strength is reduced when the area of a part of a thickness in a range between 0.5 and 10 μm of the interface reaction layer is below $10 t_2^{0.5}$ mm², more strictly, below $25 t_2^{0.5}$ mm². Steel-aluminum diffusion is insufficient and weld strength is low in a part of a thickness below 0.5 μm of the interface reaction layer. A thicker interface reaction layer is more brittle. A part of a thickness greater than 10 μm is particularly brittle and weld strength is low. Thus, the greater the area of the interface reaction layer, the lower the weld strength of the joint. Therefore, the area of a part of a thickness in a range between 0.5 and 10.5 μm of the interface reaction layer needs to be $10 t_2^{0.5}$ mm² or above, more strictly, $25 t_2^{0.5}$ mm² or above.

The thickness of the interface reaction layer, similarly to the area of the nugget, is determined through the analysis of an image of a part of the aluminum material in the interface surface in the steel-aluminum joint or the observation of a part of the aluminum material in the interface surface in the steel-aluminum joint with a SEM.

Compound Forming Boundary Reaction Layer

Figure 4:
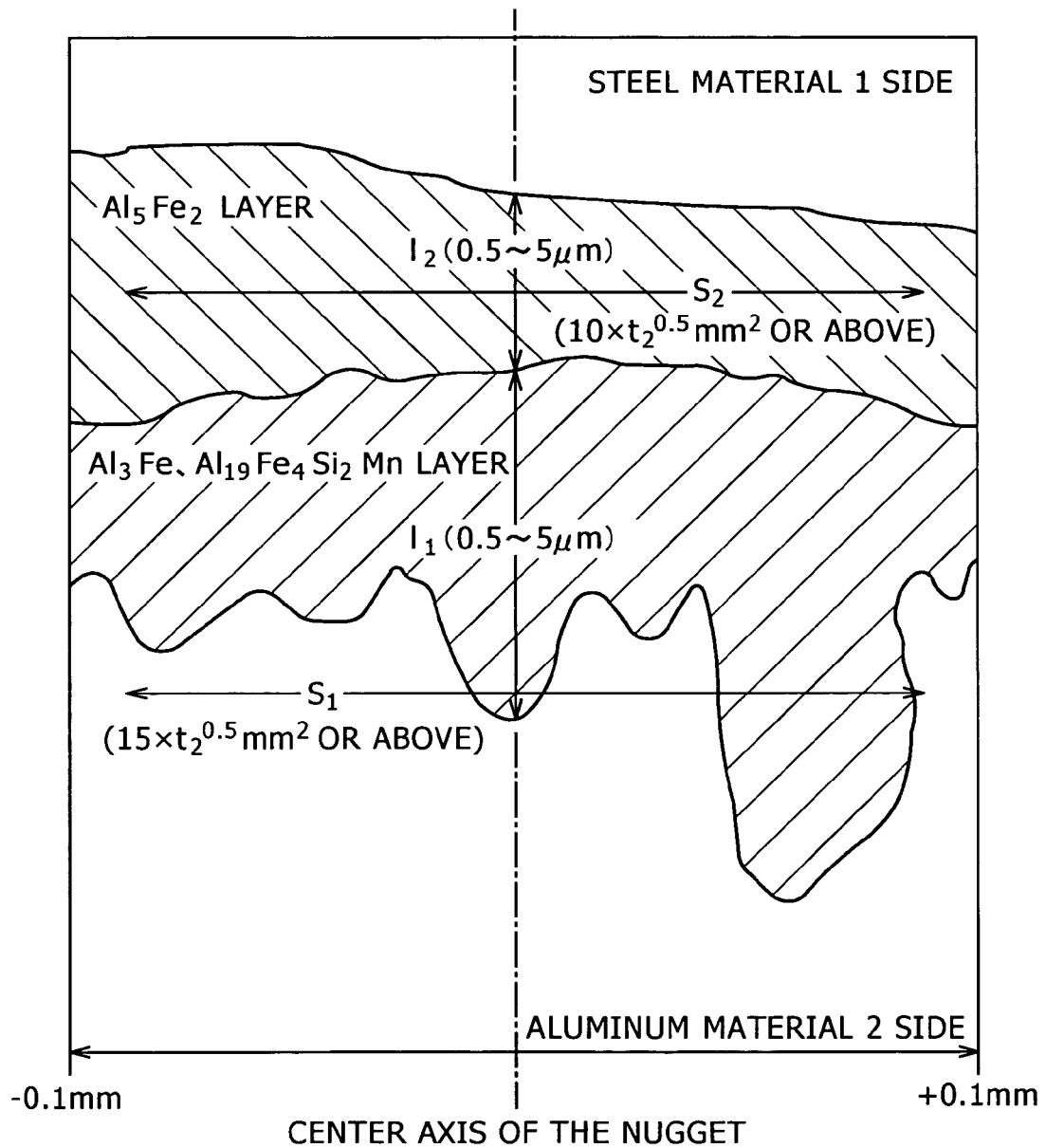
FIG. 4 is a typical view of a photograph shown in FIG. 5.
Figure 5:
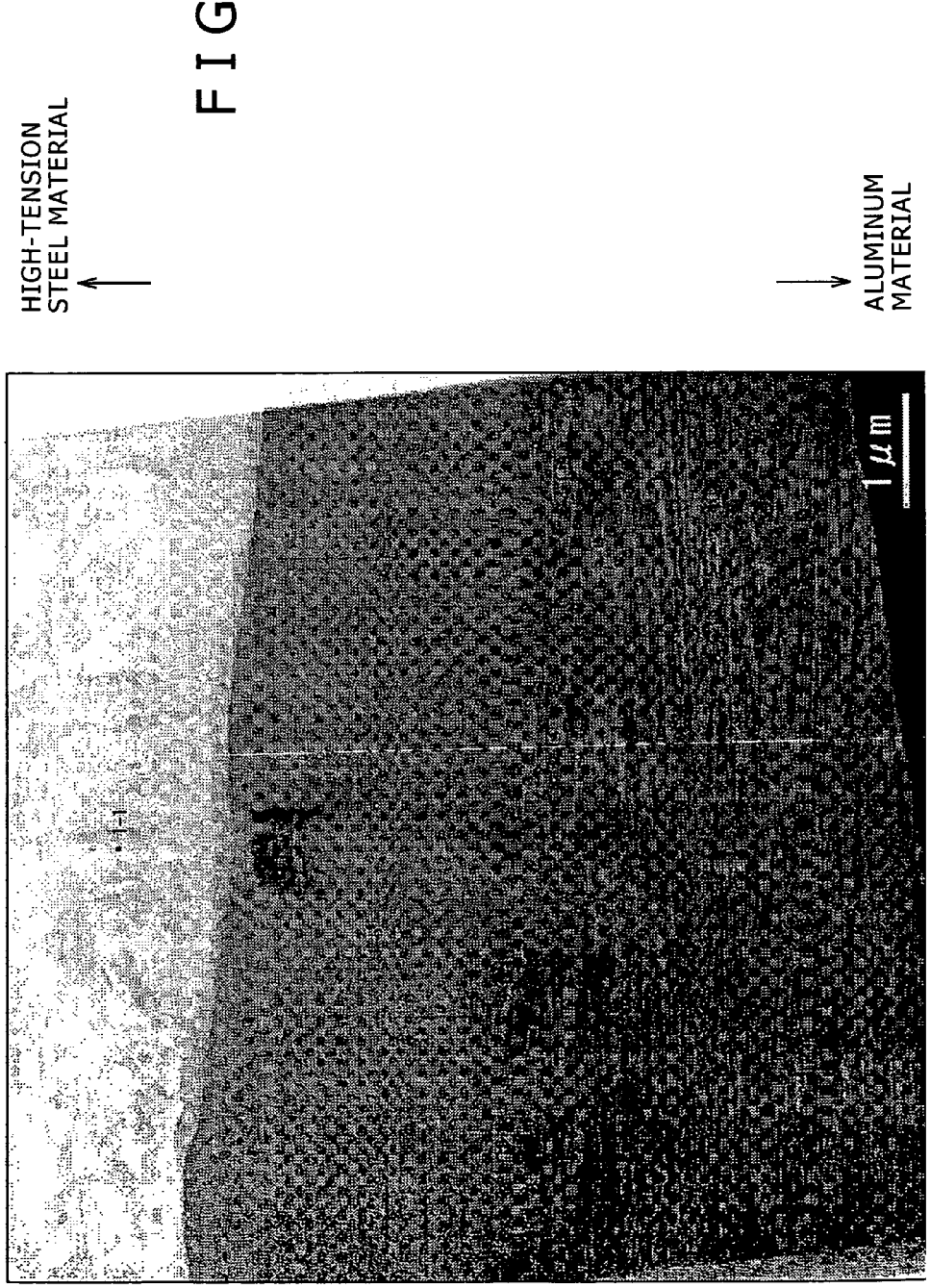
FIG. 5 is a photograph showing a sectional structure of a weld interface of a welded section in a steel-aluminum welded material according to the present invention.

Preferably, the present invention specifies an intermetallic compound in the steel-aluminum welded material, i.e., in the weld interface surface 6 shown in FIG. 1. An intermetallic compound specified by the present invention is shown in FIGS. 4 and 5 showing a section of the weld interface surface 6 in the joint of the steel-aluminum welded material. FIG. 4 is a typical view of a photograph showing a section of a weld zone in the steel-aluminum welded material shown in FIG. 4.

As shown in FIG. 4, a compound layer of $Al_5Fe_2$ is formed on the side of the steel material and a granular or acicular compound layer of $Al_3Fe$ and $Al_{19}Fe_4Si_2Mn$ is formed on the side of the aluminum material in the weld interface surface 6. In FIG. 4, a vertical dimension $l_1$ is the mean thickness along the depth of the nugget of a part corresponding to a central part of the nugget of the compound layer of $Al_3Fe$ and $Al_{19}Fe_4Si_2Mn$ formed on the side of the aluminum material and a horizontal dimension $S_1$ is the area of a part of the compound layer of $Al_3Fe$ and $Al_{19}Fe_4Si_2Mn$ in this thickness range, namely, the area, in a horizontal plane, of the joint in the steel-aluminum welded material. In FIG. 4, a vertical dimension $l_2$ is the mean thickness along the depth of the nugget of a part corresponding to the central part of the nugget of the compound layer of $Al_5Fe_2$ formed on the side of the steel material and a horizontal dimension $S_2$ is the area of a part of the compound layer of $Al_5Fe_2$ in this thickness range, namely, the area, in a horizontal plane, of the joint in the steel-aluminum welded material.

Compound Layer on the Side of Aluminum Material

Preferably, the mean thickness $l_1$ along the depth of the nugget of a part corresponding to the central part of the nugget of the compound layer of $Al_3Fe$ and $Al_{19}Fe_4Si_2Mn$ is between 0.5 and 10 μm to enhance weld strength. The term "central part" in the present invention indicates a part within ±0.1 mm from the center of the nugget.

Figure 3:
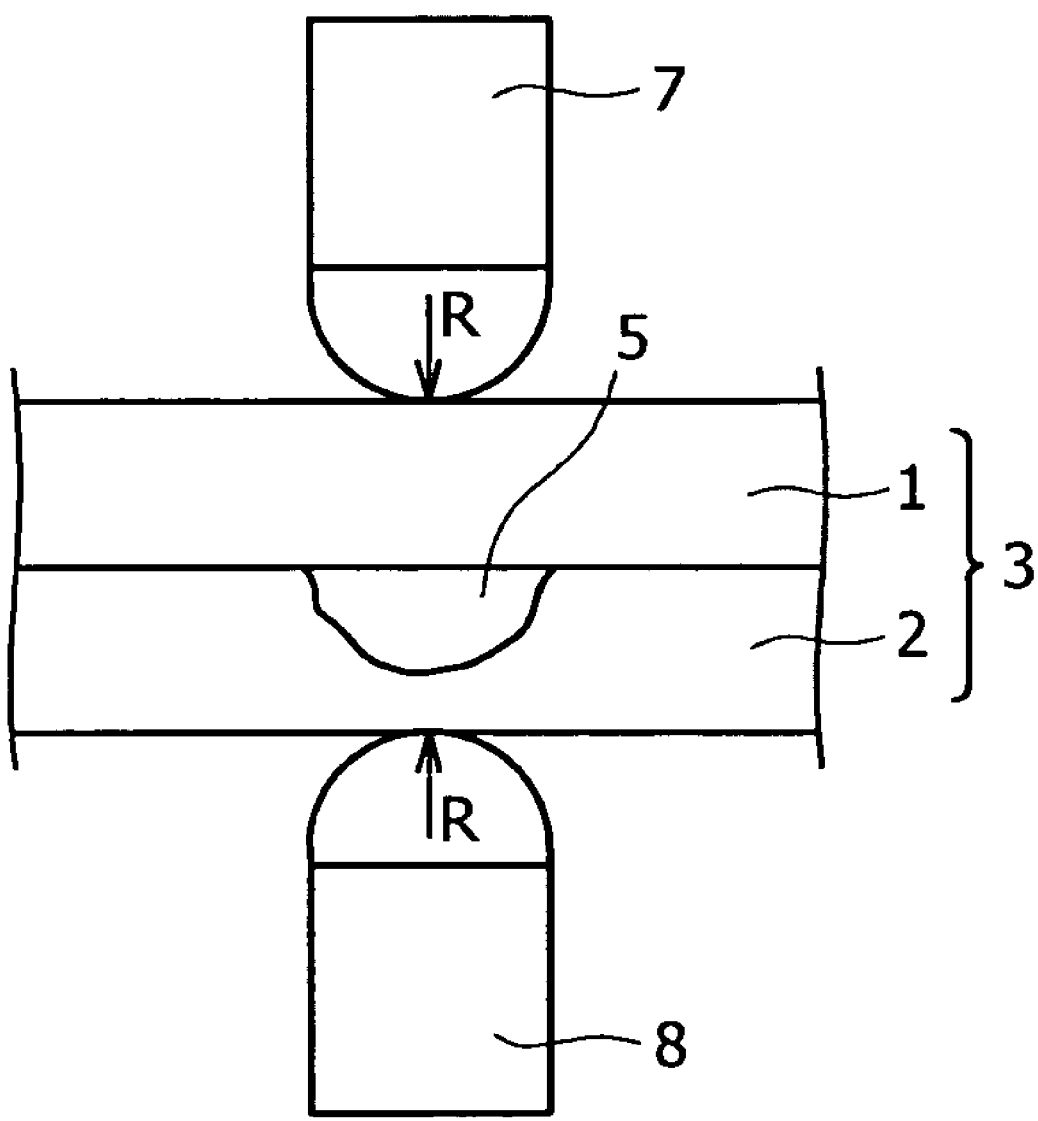
FIG. 3 is a view of assistance in explaining a spot welding process for fabricating a steel-aluminum welded material.

The compound of $Al_3Fe$ and $Al_{19}Fe_4Si_2Mn$ is an intermetallic compound on the side of the aluminum material. As shown in FIGS. 3 and 4, the compound of $Al_3Fe$ and $Al_{19}Fe_4Si_2Mn$ is a granular or acicular compound. Gains of the compound in the central part of the nugget are large (acicular grains of the compound are long) and the grain size of the gains (the length of the acicular grains) decreases gradually toward the periphery of the nugget (toward the right and the left in FIGS. 3 and 4). The density of the compound grains is small in a peripheral part of the nugget and the compound grains are scattered. the area of the compound layer of $Al_3Fe$ and $Al_{19}Fe_4Si_2Mn$ is greater than that of the compound layer of $Al_5Fe_2$.

The compound of $Al_3Fe$ and $Al_{19}Fe_4Si_2Mn$ has an anchoring effect in addition to the effect of the foregoing shape. The compound of $Al_3Fe$ and $Al_{19}Fe_4Si_2Mn$ improves the adhesion of the compound layer of $Al_5F_2$ to the aluminum material and enhances weld strength. Such effects are unavailable when the compound layers of $Al_3Fe$ and $Al_{19}Fe_4Si_2Mn$ is excessively thin. When $l_1$ is below 0.5 μm, the anchoring effect is insufficient, the adhesion of the compound layer of $Al_5Fe_2$ to the aluminum material is unsatisfactory, interlayer breakage is liable to occur and broken surfaces are flat and smooth. According to the present invention, the mean thickness $l_1$ along the depth of the nugget of the part corresponding to the central part of the nugget of the compound layer of $Al_3Fe$ and $Al_{19}Fe_4Si_2Mn$ is 0.5 μm or above.

If the compound layer of $Al_3Fe$ and $Al_{19}Fe_4Si_2Mn$ grows in an excessively big thickness, fracture starts from the individual compound grains. When $l_1$ is greater than 10 μm, this tendency is remarkable. According to the present invention, the mean thickness $l_1$ along the depth of the nugget of the part corresponding to the central part of the nugget of the compound layer of $Al_3Fe$ and $Al_{19}Fe_4Si_2Mn$ is 10 μm or below.

Compound Layer on the Side of Steel Material

According to the present invention, it is preferable, to enhance weld strength, that the area $S_2$ of a part of the compound layer of $Al_5Fe_2$ having the mean thickness $l_2$ in the range between 0.5 and 5 μm is $10\,t_2^{0.5}$ mm$^2$ or above, preferably, $20\,t_2^{0.5}$ mm$^2$ or above in addition meeting those conditions on the compound layer on the side of the aluminum material. It is preferable, to enhance weld strength, that the mean thickness $l_2$ along the depth of the nugget of a part corresponding to the central part of the nugget of the compound layer of $Al_5Fe_2$ is in a range between 0.5 and 5 μm.

Relation Between Steel-Side Compound Layer and Aluminum-Side Compound

It is preferable, to enhance weld strength, to specify the relation between the steel-side compound layer and the aluminum-side compound layer in addition to specifying the conditions respectively for the steel-side compound layer and the aluminum-side compound layer. Preferably, the compound layer of $Al_3Fe$ and $Al_{19}Fe_4Si_2Mn$ having the mean thickness $l_2$ in a range between 0.5 and 10 μm is formed in a part where the mean thickness $l_2$ of the compound layer of $Al_5Fe_2$a is formed in the weld interface in the steel-aluminum welded material, the area $S_1$ of a part of the compound layer of $Al_3Fe$ and $Al_{19}Fe_4Si_2Mn$ having a thickness in that thickness range is $15\,t_2^{0.5}$ mm$^2$ or above, preferably, $25\,t_2^{0.5}$ mm$^2$ or above.

Weld strength is higher when the area $S_1$ of a part of the compound layer of $Al_3Fe$ and $Al_{19}Fe_4Si_2Mn$ having the mean thickness in that thickness range is larger. When the area $S_1$ is below $15\,t_2^{0.5}$ mm$^2$ and the strength is the same, it is very likely that the greater the joint area of the nugget, the lower the breaking load (weld strength) sufficient to break the joint. When the joint area of the nugget is small, the joint is easy to break under a lower load. When the area $S_1$ of a part of the compound layer of $Al_3Fe$ and $Al_{19}Fe_4Si_2Mn$ having a thickness in that thickness range is $25\,t_2^{0.5}$ mm$^2$ or above, the joint (joint interface) having high weld strength is sufficiently large and hence the breaking load is large. Consequently, the breaking load sufficient to break the joint interface is far greater than that sufficient to break the aluminum material, the interfacial breakage does not occur and the aluminum material breaks.

From the viewpoint of weld strength, the area of the interface reaction layer having the optimum thickness is specified to control the relation between the compound layer on the side of the steel material and that on the side of the aluminum material by the optimum thickness and the optimum area of the interface reaction layer. According to the present invention, contrary to common knowledge that a thinner interface reaction layer is desirable, the interface reaction layer is formed intentionally. As mentioned above, the present invention is based on a technical idea of forming an interface reaction layer of a thickness in an optimum thickness range in a large area; that is, an interface reaction layer is formed in a wide range.

Weld Strength and Breakage Form

According to the present invention, the joint interface does not break and the joint breaks in the shape of a plug, i.e., a part of the aluminum material on the outer side of the compound layer of $Al_3Fe$ breaks when the weld strength is high. In other words, such a breakage form of the joint indicates that the joint formed by the present invention has high weld strength. When the weld strength is low, the joint interface breaks, the anchoring compound layer of $Al_3Fe$ and $Al_{19}Fe_4Si_2Mn$ is torn and the compound layer of $Al_5Fe_2$ and the compound layer of $Al_3Fe$ and $Al_{19}Fe_4Si_2Mn$ break apart. Such a breakage form of the joint indicates that the joint has low weld strength.

Factors Dominating Weld Strength

The respective effects of factors dominating weld strength will be reviewed.

The mean thickness $l_1$ of the compound layer of $Al_3Fe$ and $Al_{19}Fe_4Si_2Mn$ has the highest effect on the enhancement of weld strength. The area $S_2$ of the compound layer of $Al_3Fe$ having the mean thickness $l_2$ in the optimum range between 0.5 and 5 μm has a high effect on the enhancement of weld strength.

The compound layer of $Al_3Fe$ and $Al_{19}Fe_4Si_2Mn$ has the anchoring effect of producing adhesion between the aluminum material and the compound layer of $Al_5Fe_2$ and hence the mean thickness $l_1$ of the compound layer of $Al_3Fe$ and $Al_{19}Fe_4Si_2Mn$ contributes to the enhancement of weld strength in a central part of the nugget. If only the mean thickness $l_1$ of the compound layer of $Al_3Fe$ and $Al_{19}Fe_4Si_2Mn$ is adjusted, it is possible that the interface between the compound layer of $Al_3Fe$ and $Al_{19}Fe_4Si_2Mn$ and the compound layer of $Al_5Fe_2$ breaks and hence it is possible that breaking load sufficient to break the interface is not very large. The area $S_2$ of the compound layer of $Al_5Fe_2$ having the mean thickness $l_2$ in the optimum thickness range between 0.5 and 5 μm contributes to ensuring stabilized adhesion in a wide range and has an effect of enhancing breakage load sufficient to break the spot welded joint. The strength cannot be stabilized by adjusting only the area $S_2$ of the compound layer of $Al_5Fe_2$ and strength scatters in a wide range. High weld strength can be surely guaranteed by adjusting the area $S_2$ of the compound layer of $Al_5Fe_2$ in addition to adjusting the mean thickness $l_1$ of the compound layer of $Al_3Fe$ and $Al_{19}Fe_4Si_2Mn$.

The mean thickness $l_2$ along the depth of the nugget in a part corresponding to the central part of the nugget of the compound layer of $Al_5Fe_2$ and the area $S_1$ of the compound layer of $Al_3Fe$ and $Al_{19}Fe_4Si_2Mn$ having the mean thickness in the optimum thickness range contribute to the enhancement of weld strength. However the effect of those two factors on the enhancement of weld strength is low. Although the individual effects of those factors on the enhancement of weld strength is low, those factors are effective in forming a joint having the highest weld strength when those factors are adjusted properly in addition to adjusting the mean thickness $l_1$ of the compound layer of $Al_3Fe$ and $Al_{19}Fe_4Si_2Mn$ and the area $S_2$ of the compound layer of $Al_5Fe_2$.

Method of Measuring Intermetallic Compound

A photograph of the structure of the compound layer of $Al_3Fe$ and $Al_{19}Fe_4Si_2Mn$ and the compound layer of $Al_5Fe_2$ as shown in FIG. 5 is obtained through the semiquantitative analysis of an image of a section of the joint obtained by HAADF-STEM (10,000× to 20,000×) by EDX analysis. In other words, it may be difficult to achieve the recognition of the intermetallic compound specified by the present invention and the accurate measurement of the thickness and area of the intermetallic layer unless the interface of the joint is examined by a HAADF-STEM method, which will be described below.

Respective compositions of parts at measuring points 1-1 to 1-24 in the interface of the joint shown in FIG. 5 are measured, and the intermetallic compound is identified by the atomic percents (at. %) of Al, Fe, Si, Mn and Mg contained in those parts. Parts having an Al content between 73 and 95 at. %, a Fe content between 5 and 25 at. %, and a Si content below 2 at. % are decided to be those of an $Al_3Fe$ compound. Parts having an Al content between 70 and 78 at. %, a Fe content between 10 and 30 at. %, and a Si content between 2 and 15 at. % are decided to be those of a $Al_{19}Fe_4Si_2Mn$ compound. Parts having an Al content between 60 and 73 at. %, a Fe content between 25 and 30 at. %, and a Si content below 2 at. % are decided to be those of a $Al_5Fe_2$ compound.

The HAADF-STEM method (high angle annular dark field scanning transmission electron microscope method) obtains a signal by connecting electrons scattered by elastic scattering on the side of high angle by an annular detector. A HAADF-STEM image is scarcely subject to the influence of diffraction contrast and the contrast is proportional approximately to the square of atomic number (Z). An image obtained by the HAAD-STEM method is a two-dimensional map having information about the composition. The HAAD-STEM method can accurately detect traces of elements and hence the HAAD-STEM method is effective in analyzing the microstructure of the interface of the joint.

More specifically, a welded material is cut across a central part of a nugget to obtain a test sample, the test sample is embedded in a resin such that a section of the test sample can be observed, and the section is mirror-finished by polishing. The respective thicknesses of compound layers in an interface reaction layer are measured roughly with a SIM. A central part of the nugget, a part on the inner side of the interface of a layer supposed to be a compound layer of $Al_5Fe_2$, parts on the inner and the outer side of the interface of a layer supposed to be a compound layer of $Al_3Fe$ and $Al_{19}Fe_4Si_2Mn$ and parts on the inner and the outer side of parts having thicknesses greater than the upper limit thicknesses of the compound layers are thinned in a thickness that permits TEM observation by a FIB process using a focused ion beam machining device (FB-2000A, Hitachi, Ltd.) to obtain a test sample for observation and analysis. The test sample was examined with a field emission transmission electron microscope (10,000× to 20,000×) (JEM-201F, JEOL). Acceleration voltage is 200 kV and field is 100 μm. Grains and different phases are examined by EDX point analysis to identify a compound layer of $Al_5Fe_2$ and a compound layer of $Al_3Fe$ and $Al_{19}Fe_4Si_2Mn$.

The thickness (length) along depth of the compound layer of $Al_3Fe$ and $Al_{19}Fe_4Si_2Mn$ were determined by measuring the thickness of the same in a HAADF-STEM image in a field of 10 μm. Lengths along depth of granular and acicular grains of $Al_3Fe$ and $Al_{19}Fe_4Si_2Mn$ and mean lengths were calculated. Thicknesses (lengths) of five parts of the image of the compound layer of $Al_5Fe_2$ were measured and a mean thickness was calculated. All the test samples were measured. When dome-shaped electrode tips were used for spot welding, the respective thicknesses of both the compound layers decreased from a central part toward a peripheral part. The diameter of a circle corresponding to a part having a thickness greater than the upper limit and that of a circle corresponding to a part having a thickness below the lower limit of each compound layer were measured, and an area of a part in the optimum thickness range of each compound layer was calculated.

Composition of Boundary Reaction Layer

Preferably, the interface reaction layer has a desired Mn content and a desired Si content to enhance weld strength. The Mn content and the Si content the interface reaction layer are represented by those of a middle part with respect to thickness of the interface reaction layer. Preferably, the middle part of the interface reaction layer has a Mn content 1.5 times that of the steel material or above.

Preferably, the middle part of the interface reaction layer has a Si content 1.1 times that of the aluminum material or above and 1.1 times that of the steel material or above.

To form an interface reaction layer having the desired Mn content and the desired Si content, the steel material and the aluminum material need to have an optimum Mn content and an optimum Si content and welding conditions for spot welding need to be optimized. Actual tests proved that the Mn content of the interface reaction layer can be increased to 2.5 times that of the steel material at a maximum, and the Si content of the interface reaction layer can be increased up to 1.8 times those of the steel material and the aluminum material at a maximum. There is a tendency that weld strength is higher when the Mn content and the Si content are higher within the obtained content ranges.

The Mn content and the Si content of the interface reaction layer can be determined through the determination of the respective secondary ionic strengths of Mn and Si by TEM-EDX analysis or SIMS analysis of the section of the welded joint. The SIMS analysis of the secondary ionic strengths of Mn and Si is recommended because errors in data obtained by SIMS analysis are small. The ratio of the Mn content of the interface reaction layer to that of the steel material, the ratio of the Si content of the interface reaction layer to that of the steel material and the ration of the Si content of the interface reaction layer to that of the aluminum material are calculated by using data on the secondary ionic strength of Mn and Si in the middle part of the interface reaction layer and data on the Mn contents and Si contents of the aluminum material and the steel material obtained by SIMS.

Thickness Reduction of Aluminum Sheet

It is desirable that the reduction of the thickness of a spot welded part of the aluminum material is limited to the least possible extent to form a joint having sufficient weld strength. Desirably, the smallest thickness Δt of the aluminum material after spot welding is as a standard, 50% of the thickness $t_2$ or above. Preferably, the smallest thickness Δt is 90% of the thickness $t_2$ or above. The smallest thickness Δt of the aluminum material can be determined by measuring a reduced thickness through the observation of the section with an optical microscope or a SEM and subtracting the measured reduced thickness from the original thickness $t_2$ of the aluminum material.

Deposited Film

The joining surface of the aluminum material or the steel material may be coated with a deposited film of Zn and/oral having a melting point in a range between 350° C. and 950° C. before welding together the steel material and the aluminum material. The deposited film having a melting point nearly equal to that of the aluminum material and an optimum thickness and interposed between the steel material and the aluminum material can control time in which the interface reaction layer of a steel-aluminum intermetallic compound is formed and can form the interface reaction layer of a proper thickness between 0.5 and 10.5 μm. If the deposited film has a thickness below 3 μm or the deposited film has a melting point below 350° C., the deposited film melts and is expelled at the initial stage of welding and cannot suppress the formation of a brittle interface reaction layer. If the deposited film has a thickness above 15 μm or the deposited film has a melting point above 950° C., a large amount of welding heat input is necessary to melt and expel the deposited film. Therefore, the thickness of the deposited film is in a range between 3 and 15 μm, preferably, between 5 and 10 μm and the melting point of the deposited film is in a range between 350° C. and 950° C., preferably, 400° C. and 900° C. Most preferably, the melting point of the deposited film is in a range between a temperature not lower than the melting point of aluminum and 900° C.

The thickness of the deposited film is determined by a method including cutting out a test sample from a plated material, embedding the test sample in a resin, polishing the section of the test sample and observing the polished section of the test sample with a SEM. Preferably, the magnification of the SEM is 2,000× and the mean of the measured thicknesses of three points is calculated.

A deposited film meeting the foregoing conditions is capable of imparting corrosion resistance to the steel material when the deposited film is formed on the steel and of being easily deposited on the steel material and the aluminum material. Preferably, the deposited film is made of a material containing Zn and Al as principal components. Desirably, the deposited film is made of a material containing Zn or Al or containing both Zn and Al in a content of 80% or above.

When the steel material is coated beforehand with a deposited film containing Zn and Al as principal components, structural members formed by processing the steel material has an improved corrosion resistance. Generally, the steel material is coated with a film of a coating material. Even if the film of a coating material is damaged, the steel material, namely, the base material, is protected from corrosion because Zn and Al contained in the deposited film are preferentially corroded. Since the deposited film reduces potential difference between the steel material and the aluminum material, contact corrosion resulting from contact between different metals, which is a problem in the steel-aluminum welded material, can be suppressed.

Al film, Al—Zn film, Zn film and Zn—Fe film are examples of the deposited film containing Zn or Al as a principal component. According to the present invention, it is preferable to suppress the formation of a brittle intermetallic compound layer by increasing the Mn content and the Si content of the interface reaction layer and to form an intermetallic compound layer capable of preventing the interface reaction layer from being easily broken. To achieve such purposes, it seems to be efficient that the deposited film contains Si and Mn. When it is desired to increase the Mn content and the Si content of the interface reaction layer, the deposited film containing Zn and Al as principal components needs to contain Si and Mn in 5% by mass or above. However, if the deposited film contains Si and Mn excessively, a part around the nugget becomes easy to be cracked. This tendency is particularly remarkable when the deposited film contains Mn. Therefore, deposited films containing Zn and Al as principal components and containing Mn and Si other than the Al—Si deposited film are in practicable. In other words, it is significant to increase the Mn content and the Si content of the interface reaction layer by adjusting the Mn content of the steel material and the Si content of the aluminum material.

It is known from the foregoing description that a deposited Zn film having a Zn content of 88% by mass or above is recommendable as the deposited film containing Zn and Al as principal components according to the present invention. It is recommended to coat the surface of the steel material with a deposited Zn film having a Fe content in a range between 8 and 12% by mass.

A steel material having a surface coated with a deposited Zn film having a Zn content of 88% by mass or above has a particularly high corrosion resistance. The melting point of the deposited Zn film can be easily controlled in a range between 350° C. and 950° C. Iron (Fe) left over after a deposited Zn film having a Zn content of 88% by mass or above and a Fe content in a range between 8 and 12% by mass has been melted and expelled reacts efficiently with the aluminum material. Consequently, the formation of the interface reaction layer can be controlled in a short time and the interface reaction layer can be formed in an optimum thickness in a range between 0.5 and 10.5 μm. Naturally, corrosion resistance is high and contact corrosion resulting from contact between different metals can be suppressed.

The deposited film may contain elements in addition to the foregoing elements. Types of the additional elements and the respective contents of the additional elements are to be selectively determined so that the melting point of the deposited film is within the range specified by the present invention, the corrosion resistance of the deposited film may not be deteriorated and faulty welding causing a part around the nugget to crack will not occur.

The present invention does not place any restrictions on the plating method of plating the steel material or the aluminum material. The plating method may be a known wet plating process or a known dry plating process. An electroplating process, a hot dipping process, and a plating process including a hot dipping step and a subsequent alloying step are recommended. An electroplating process and a zincate conversion process are recommendable for Zn-plating the aluminum material.

Spot Welding

FIG. 3 illustrates a spot welding method of building the steel-aluminum welded material by way of example. Shown in FIG. 3 are a steel material 1, an aluminum alloy sheet 2, a steel-aluminum welded material 3, a nugget 5, and electrodes 7 and 8.

Spot welding conditions for forming a steel-aluminum welded material according to the present invention will be described.

Welding Pressure

A comparatively high welding pressure needs to be used for spot welding to form the nugget in a comparatively large necessary area, to form an optimum interface reaction layer in a necessary area and to adjust the mean thickness $l_1$ of the compound layer of $Al_3Fe$ and $Al_{19}Fe_4Si_2Mn$, the mean thickness $l_2$ of the part of the compound layer of $Al_5Fe_2$ in the central part of the nugget, the area $S_1$ of the part of the compound layer of $Al_3Fe$ and $Al_{19}Fe_4Si_2Mn$ in the optimum thickness range and the area $S_2$ of the compound layer of $Al_5Fe_2$ to those in the corresponding optimum ranges specified by the present invention.

More specifically, the welding pressure is within a comparatively high pressure range between $2\,t_2^{0.5}$ and $4\,t_2^{0.5}$ kN, where $t_2$ is the thickness of the aluminum material. Even if the welding pressure is within that pressure range, other welding conditions dominate the formation of the foregoing compound layers and the dimensions of the compound layers are not necessarily within the corresponding optimum ranges specified by the present invention. Therefore, an optimum welding pressure needs to be selected from those in the comparatively high pressure range specified by the present invention according to the qualities of the materials and other welding conditions.

When a comparatively high welding pressure is used, stable electrical contact between the steel material and the aluminum material and between the electrodes and the materials can be achieved regardless of the shape of the electrode tips, a molten metal in the nugget can be supported by an unmelted part surrounding the nugget. Consequently, the nugget can be formed in a comparatively large necessary area, the interface reaction layer can be formed in a necessary area and expulsion and surface flush can be controlled.

Spot welding cannot exercise the foregoing effects when a low welding pressures below $2\,t_2^{0.5}$ kN is used. When the welding pressure is excessively low and the electrode tips have rounded ends, the electrode tips are in contact with the steel material and the aluminum material in a small contact area. Consequently, a nugget having a small area is formed, current density increases to cause the interface reaction layer to increase and weld strength decreases. It is highly possible that the compound layer of $Al_3Fe$ and $Al_{19}Fe_4Si_2Mn$ cannot be formed in the mean thickness $l_1$ and the part in the range of ±0.1 mm around the center of the nugget of the compound layer of $Al_5Fe_2$ cannot be formed in the mean thickness $l_2$.

The area of the nugget decreases with the increase of the welding pressure. When a welding pressure above $4\,t_2^{0.5}$ kN is used, a high welding current exceeding the optimum welding current needs to be supplied to form the nugget in a desired area. Such a high welding current causes splash and causes the interface reaction layer to grow and hence reduces weld strength. The aluminum material deforms greatly and a large depression is formed in a welded part, which affects adversely to the appearance of the steel-aluminum welded material.

Welding Current

A comparatively high welding current needs to be supplied for a short time for spot welding to form the nugget in a comparatively large necessary area, to form an optimum interface reaction layer in a necessary area and to adjust the mean thickness $l_1$ of the compound layer of $Al_3Fe$ and $Al_{19}Fe_4Si_2Mn$, the mean thickness $l_2$ of the part of the compound layer of $Al_5Fe_2$ in the central part of the nugget, the area $S_1$ of the part of the compound layer of $Al_3Fe$ and $Al_{19}Fe_4Si_2Mn$ in the optimum thickness range and the area $S_2$ of the compound layer of $Al_5Fe_2$ to those in the corresponding optimum ranges specified by the present invention.

More specifically, a comparatively high welding current in a range between $15\,t_2^{0.5}$ and $30\,t_2^{0.5}$ kA needs to be supplied for a short time below $100\,t_2^{0.5}$ ms. Even if the welding current within that current range is supplied for that short time, other welding conditions dominate the formation of the foregoing compound layers and the dimensions of the compound layers are not necessarily within the corresponding optimum ranges specified by the present invention. Therefore, an optimum welding current and an optimum welding time need to be selected from those in the comparatively high current range and those in the time range specified by the present invention according to the qualities of the materials and other welding conditions.

When a comparatively high welding current is supplied for a short time, stable electrical contact between the steel material and the aluminum material, and between the electrodes and the materials can be achieved, a molten metal in the nugget can be supported by an unmelted part surrounding the nugget. Consequently, the nugget can be formed in a comparatively large necessary area, the interface reaction layer can be formed in a necessary area and expulsion and surface flush can be controlled.

A low welding current below $15\,t_2^{0.5}$ kA, more strictly, below $18\,t_2^{0.5}$ kA cannot generate a welding heat input sufficient for forming and growing a nugget and, consequently, the nugget cannot be formed in the comparatively large area and the optimum interface reaction layer cannot be formed in the necessary area. It is highly possible that the compound layer of $Al_3Fe$ and $Al_{19}Fe_4Si_2Mn$ cannot be formed in the mean thickness $l_1$ and the part in the range of ±0.1 mm around the center of the nugget of the compound layer of $Al_5Fe_2$ cannot be formed in the mean thickness $l_2$.

To supply a high welding current exceeding $30\,t_2^{0.5}$ kA, additional equipment is needed, which is disadvantageous in work and cost. Thus the welding current is $^{0.5}$ kA or below. Therefore, the welding current is within a range between $15\,t_2^{0.5}$ and $30\,t_2^{0.5}$ kA, preferably, $18\,t_2^{0.5}$ and $30\,t_2^{0.5}$ kA.

Welding Time

Welding time is a comparatively shot time of $100\,t_2^{0.5}$ ms, where $t_2$ is the thickness of the aluminum material. Although a long welding time exceeding $100\,t_2^{0.5}$ ms can form the nugget in a desired diameter, such a long welding time causes splash and the growth of the interface reaction layer and, consequently, the weld strength is low. To control the interface reaction layer, the welding time is $100\,t_2^{0.5}$ ms or below, preferably in a range between $20\,t_2^{0.5}$ and $80\,t_2^{0.5}$ ms. It is necessary to select an optimum welding time so that optimum control of the compounds specified by the present invention can be achieved taking into consideration the qualities of materials, welding conditions and the welding current.

Shape of Electrodes

The electrode tips may be of any shape, provided that the nugget of the foregoing area and the interface reaction layer can be formed. The electrode tips to be brought into contact respectively with the steel material and the aluminum material may differ from each other in shape and size. Desirably, both the electrode tips to be brought into contact with the steel material and the aluminum material are dome-shaped electrode tips having a rounded end as shown in FIG. 3. The diameter and the radius R of the rounded end of each electrode tip need to be 7 mm or above and 100 mm or above, respectively, to achieve both reducing current density and increasing the area of the nugget. When dc spot welding is used, it is desirable that the respective polarities of the electrodes to be brought respectively into contact with the aluminum material and the steel material are positive and negative, respectively.

Both the reduction of current density and the increase of the area of the nugget can be properly achieved by using electrode tips having rounded ends of 7 mm or above in diameter and 120 mm or above in radius. When such electrode tips are used, a preferable welding pressure is in a range between 2.5 $t_2^{0.5}$ and 4 $t_2^{0.5}$ kN, a preferable welding current is in a range between 18 $t_2^{0.5}$ and 30 $t_2^{0.5}$ kA and a preferable welding time is 100 $t_2^{0.5}$ ms or below.

Those optimum conditions must be well balanced. For example, the welding current is increased to form the interface reaction layer in an optimum thickness when the diameter and the radius R of the rounded ends of the electrode tips are increased to reduce current density. Welding conditions for lower welding currents may be added to the foregoing welding conditions and welding current may be supplied in a stepped pattern, provided that the additional conditions and the supply of the welding current in the stepped pattern are not detrimental to the formation of the nugget in the desired area and the formation of the interface reaction layer in the optimum thickness.

Description has been made of the welding conditions necessary for forming the nugget of a desired area and the interface reaction layer of the optimum thickness in the steel-aluminum welded material having high weld strength. Description will be made of a spot welding method of welding together a steel material and an aluminum material when a deposited film of Zn and/or Al having a thickness between 3 and 15 μm and a melting point between 350° C. and 950° C. is formed on the joining surface of the steel material or the aluminum material.

Control of the spot welding conditions is important, when the deposited film is formed on the joining surface, to achieve the optimum control of the formation of the interface reaction layer in addition to prevent the deposited film from remaining in the interface reaction layer, to form the nugget in the necessary area and to form the optimum interface reaction layer in the necessary thickness.

The shape of the electrodes, and the welding pressure have the foregoing actions and effects.

Welding Current and Welding Time

Preferably, a selected spot welding process is a high-current spot welding process to form the nugget of the necessary area and the optimum interface reaction layer of the necessary area. The high-current spot welding process controls the cracking of the nugget. When there is the deposited film, an optimum welding time is dependent on the type and thickness of the deposited film and hence any optimum welding time will not be specified. It is necessary to determine a welding time depending on the diameter of the nugget without depending on the type and the thickness of the deposited film. The foregoing ranges of welding current and the diameter of the nugget are effective. However, the high-current spot welding process cannot completely melt and expel the deposited film and part of the deposited film remains. Consequently, the area of a part of the interface reaction layer having a thickness between 0.5 and 10.5 μm is small and the area is insufficient to provide high strength. Therefore, a low-current spot welding process subsequent to the high-current spot welding process is necessary to melt and expel the deposited film. The low-current spot welding process uses a welding pressure in a range between 2 $t_2^{0.5}$ and 4 $t_2^{0.5}$ kN and supplies a current in a range between $t_2^{0.5}$ and 10 $t_2^{0.5}$ kA for a time in a range between 100 $t_2^{0.5}$ and 1000 $t_2^{0.5}$ ms. The welding pressure may be different from that used by the precedent process but must be in the same range. The effect of a welding current below $t_2^{0.5}$ kA or a welding time of 100 $t_2^{0.5}$ m on melting and expelling the deposited film is insufficient. Whereas a welding current exceeding 10 $t_2^{0.5}$ kA or a welding time exceeding 1000 $t_2^{0.5}$ ms increases the diameter of the nugget, such a welding current or such a welding time promotes the formation of the interface reaction layer and decreases the area of a part of the interface reaction layer having a thickness between 0.5 and 10.5 μm. Therefore, a plurality of processes including at least two process meeting controlled ranges of conditions.

Description will be made of a spot welding method whose chief aim is to suppress the cracking of a nugget of a steel-aluminum welded material formed by welding together a steel material and an aluminum material by spot welding and intended for use in which the cracking of a nugget is a problem.

The inventors of the present invention found, through studies made to develop a spot welding method of spot welding a steel material and an aluminum material so that nuggets formed by spot welding may not crack, that it is very effective in preventing the cracking of nuggets to use a welding current lower than a welding current at an initial stage of spot welding cycle at a terminal stage of the spot welding cycle. The inventors examined optimum welding conditions on the basis of the finding and have made the present invention. Welding conditions according to the present invention effective in preventing the cracking of a nugget and the effects of those welding conditions will be described.

Figure 6:
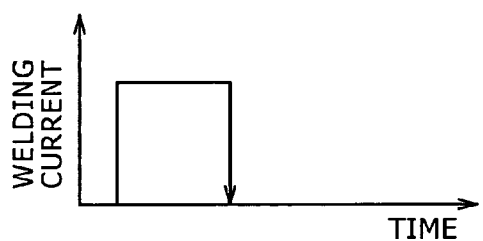
FIG. 6 is a graph typically showing a current supply pattern in which current is supplied by a known method.
Figure 7:
FIG. 7 is a graph typically showing the variation of the temperature of a nugget when welding current is supplied in the current supply pattern shown in FIG. 6.

When a spot welding method uses a spot welding cycle in which a fixed welding current as shown in FIG. 6 is supplied, or a spot welding cycle, not shown, in which a welding current higher than a welding current supplied at an initial stage of the spot welding cycle is supplied at a terminal stage of the spot welding cycle, the temperature of a nugget drops sharply as shown in FIG. 7 immediately after the termination of current supply. It is conjectured that a great strain that cannot be absorbed by the nugget is developed in the nugget and the nugget cracks when such a spot welding cycle is used.

Figure 8:
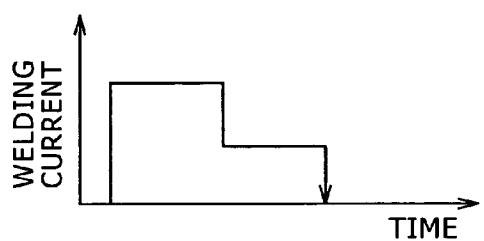
FIG. 8 is a graph typically showing a current supply pattern in which current is supplied by a method according to the present invention.
Figure 9:
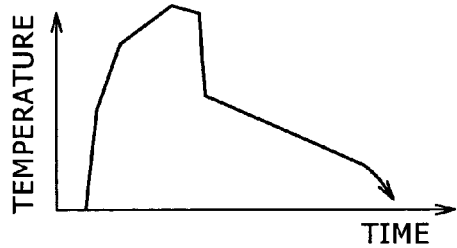
FIG. 9 is a graph typically showing the variation of the temperature of a nugget when welding current is supplied in the current supply pattern shown in FIG. 8.

When a spot welding method uses a spot welding cycle in which a welding current is varied in two steps as shown in FIG. 8, in which a welding current at the terminal stage of the spot welding cycle is lower than a welding current at the initial stage of the spot welding cycle, a nugget cools gradually as shown in FIG. 9. It is conjectured that a small thermal strain that can be absorbed by the nugget is developed in the nugget and hence the cracking of the nugget can be suppressed.

The present invention is characterized in that a welding current to be supplied at a terminal stage of a spot welding cycle is lower than a welding current to be supplied at an initial stage of the spot welding cycle. Such a mode of supplying welding current may be carried out by any suitable means. For example, a welding current supply method may decrease welding current in two steps as shown in FIG. 8 or in three steps another welding current supply method may decrease welding current continuously. From the viewpoint of operation efficiency, it is preferable to supply welding current in a two-step current supply pattern as shown in FIG. 8.

The inventors of the present invention studied the relation between cooling rate and the cracking of a nugget to find a cooling rate range that can surely suppress the cracking of a nugget. It was found through studies that it is desirable to cool a nugget formed by welding on the side of the aluminum material from 600° C. to 200° C. at a cooling rate of 2500° C./s or below. It is effective in suppressing the cracking of a nugget during solidification to control cooling rate in such a temperature range because a nugget formed on the side of the aluminum material starts solidifying at a temperature in a range between about 600° C. and about 500° C. and solidifies completely at about 200° C., which is dependent on the type of an aluminum alloy forming the aluminum material though. Although it is preferable that the cooling rate is 2000° C./s or below, the lower limit of cooling rate is about 500° C./s from the viewpoint of operation efficiency.

The inventors of the present invention made studies of conditions of supplying welding current and found that, when welding current is supplied at least at two stages, namely, a first stage and a second stage subsequent to the first state, in a two-step current supply pattern as shown in FIG. 8 for resistance spot welding, it is effective to control welding current such that a welding current to be supplied at the second stage is 70% to 10% of a welding current to be supplied at the first stage.

The effect of the present invention cannot be exhibited if the welding current supplied at the second stage is above 70% of the welding current supplied at the first stage because the effect of such a two-step current supply pattern is scarcely different from that of a conventional one-step current supply pattern. Preferably, the welding current to be supplied at the second stage is 50% of the welding current to be supplied at the first stage or below. The nugget is cooled rapidly and cracks develop easily in a nugget upon the start of the second stage if the welding current to be supplied at the second stage is below 10% of the welding current to be supplied at the first stage. Therefore, it is desirable that a welding current to be supplied at the second stage is not lower than 20% of a welding current to be supplied at the first stage.

Although the present invention does not place further restrictions on welding current and welding time, it is desirable to supply a welding current so as to meet the following current supply conditions. When the electrode tip has a rounded end having a diameter of 6 mm or above and a round shape having a radius R below 75 mm, the aluminum material can be melted for metallurgical welding by supplying a welding current of 8 kA or above (preferably, 10 kA or above) at the first stage. The aluminum material is melted excessively and splash occurs easily if the welding current is excessively high. Desirably, a welding current for the first stage is $18.0 \times t_2^{0.5}$ kA or below, preferably, $15.0 \times t_2^{0.5}$ kA or below. It is desirable that a welding current for the first stage is in a range between $15.0 \times t_2^{0.5}$ and $30.0 \times t_2^{0.5}$ kA when the electrode tip has a rounded end having a diameter of 6 mm or above and a round shape having a radius R of 75 mm or above and below 120 mm or in a range between $18.0 \times t_2^{0.5}$ and $30.0 \times t_2^{0.5}$ kA when the electrode tip has a rounded end having a diameter of 6 mm or above and a round shape having a radius R of 120 mm or above.

A desirable welding time for the first stage necessary for reliable welding is 30 ms or above, preferably 40 ms or above when the electrode tip has a rounded end having a diameter of 6 mm or above and a round shape having a radius R below 75 mm. An excessively long welding time is undesirable because splash occurs in the aluminum material and an easily cracking nugget having a small thickness is formed if welding time is excessively long. Desirably, a welding time for the first stage is 600 ms or below. When the electrode tip has a rounded end having a diameter of 6 mm or above and a round shape having a radius R not smaller than 75 mm, the area of contact between the electrode tip and the sheet is large and splash occurs easily. Desirably, welding time for the first stage is $100 \times t_2^{0.5}$ ms or below, preferably, in a range between $20 \times t_2^{0.5}$ and $80 \times t_2^{0.5}$ ms.

Although dependent on welding current a desirable welding pressure for the first stage for reliable welding is 1.0 kN or above when the electrode tip has a rounded end having a diameter of 6 mm or above and a round shape having a radius R below 75 mm. Splash occurs easily when welding pressure is excessively high. A desirable welding pressure is $1.4 \times I^2 \times 10^{-8}$ kN or below, where I is welding current (A). The area of contact between the electrode tip and the sheet is large and current density is low when the electrode tip has a rounded end having a diameter of 6 mm or above and a round shape having a radius R of 75 mm or above and below 120 mm. Therefore, it is necessary to use a comparatively high welding pressure in a range between $2.0 \times t_2^{0.5}$ and $4.0 \times t_2^{0.5}$ kN. It is necessary to use a welding pressure in a range between $2.5 \times t_2^{0.5}$ and $4.0 \times t_2^{0.5}$ kN when the electrode tip has a rounded end having a diameter of 6 mm or above and a round shape having a radius R not smaller than 120 mm.

There are not particular restrictions on current supplying conditions for the second stage, except that a welding current for the second stage is 70% to 10% of the welding current for the first stage. Cooling rate cannot be sufficiently reduced and the nugget is cooled rapidly if a welding time for the second stage is excessively short. A desirable welding time for the second stage is 50 ms or above. Since splash occurs easily if welding time for the second stage is excessively long, it is desirable that a welding time for the second stage is not longer than 600 ms.

Although there are not particular limits to welding pressure for the second stage, a desirable welding pressure is 1 kN or above for reliable welding. Problems similar to those that may arise at the first stage arise at the second stage if welding pressure is excessively high. It is desirable that welding pressure for the second stage is 6 kN or below.

The inventors of the present invention studied welding current supply conditions for different materials. It was found that respective weld conditions of different aluminum alloy materials welded under the same welding conditions are scarcely different from each other. It was found that some steel materials respectively having different strengths welded under the same welding conditions have different weld conditions dependent on strength. There is a tendency that a nugget formed in an aluminum material welded to a steel material having high strength is thin and cracks easily. It is conjectured that such a tendency is due to the promotion of heat generation by a large amount of alloying elements contained in the high-strength steel material and the resulting melting and flashing of the aluminum material. It was found that the adjustment of welding current supply conditions according to the strength level of the steel material is very effective and it is desirable to use a smaller amount of electricity for welding a steel material having a higher strength. The welding current supply conditions will be described below.

(I) Strength of Steel Material: Below 390 MPa (I-1) End of Electrode Tip: Diameter: 6 mm or Above, Radius R: Below 75 mm.

Welding Conditions for First Stage

Welding current (I): $18.0 \times t_2^{0.5}$ kA or below ($t_2$ indicates the thickness (mm) of the aluminum material Welding pressure (F): $9.8 \times I^2 \times 10^{-9}$ kN or below (I indicates current (A))

Welding time: 600 ms or below

Welding Conditions for Second Stage

Welding current (I): 2.0 to 6.0 kA

Welding pressure (F): 0.5 to 2.5 kN
Welding time: 50 to 600 ms
(I-2) End of Electrode Tip: Diameter: 6 mm or Above, Radius R: 75 mm or Above and Below 120 mm
  Welding Conditions for First Stage
  Welding current (I): $15.0 \times t_2^{0.5}$ to $30.0 \times t_2^{0.5}$ kA ($t_2$ indicates the thickness (mm) of the aluminum material
  Welding pressure (F): $2.0 \times t_2^{0.5}$ to $3.5 \times t_2^{0.5}$ kN
  Welding time: $100 \times t_2$ ms or below
  Welding Conditions for Second Stage
  Welding current (I): 2.0 to 20.0 kA
  Welding pressure (F): 0.5 to 3.5 kN
  Welding time: 50 to 600 ms
(I-3) End of Electrode Tip: Diameter: 6 mm or Above, Radius R: 120 mm or Above
  Welding Conditions for First Stage
  Welding current (I): $15.0 \times t_2^{0.5}$ to $30.0 \times t_2^{0.5}$ kA ($t_2$ indicates the thickness (mm) of the aluminum material
  Welding pressure (F): $2.5 \times t_2^{0.5}$ to $3.5 \times t_2^{0.5}$ kN
  Welding time: $100 \times t_2$ ms or below
  Welding Conditions for Second Stage
  Welding current (I): 2.0 to 20.0 kA
  Welding pressure (F): 1.0 to 4.0 kN
  Welding time: 50 to 600 ms
(II) Strength of Steel Material: 390 or Above and Below 890 MPa
(II-1) End of Electrode Tip: Diameter: 6 mm or Above, Radius R: Below 75 mm.
  Welding Conditions for First Stage
  Welding current (I): $18.0 \times t_2^{0.5}$ kA or below ($t_2$ indicates the thickness (mm) of the aluminum material
  Welding pressure (F): $1.2 \times I^2 \times 10^{-8}$ kN or below (I indicates current (A))
  Welding time: 400 ms or below
  Welding Conditions for Second Stage
  Welding current (I): 2.0 to 6.0 kA
  Welding pressure (F): 1.0 to 3.0 kN
  Welding time: 50 to 500 ms
(II-2) End of Electrode Tip: Diameter: 6 mm or Above, Radius R: 75 mm or Above and Below 120 mm
  Welding Conditions for First Stage
  Welding current (I): $15.0 \times t_2^{0.5}$ to $30.0 \times t_2^{0.5}$ kA ($t_2$ indicates the thickness (mm) of the aluminum material
  Welding pressure (F): $2.0 \times t_2^{0.5}$ to $4.0 \times t_2^{0.5}$ kN
  Welding time: $100 \times t_2$ ms or below
  Welding Conditions for Second Stage
  Welding current (I): 2.0 to 20.0 kA
  Welding pressure (F): 0.5 t6o 3.5 kN
  Welding time: 50 to 600 ms
(II-3) End of Electrode Tip: Diameter: 6 mm or Above, Radius R: 120 mm or Above
  Welding Conditions for First Stage
  Welding current (I): $15.0 \times t_2^{0.5}$ to $30.0 \times t_2^{0.5}$ kA ($t_2$ indicates the thickness (mm) of the aluminum material
  Welding pressure (F): $2.0 \times t_2^{0.5}$ to $4.0 \times t_2^{0.5}$ kN
  Welding time: $100 \times t_2$ ms or below
  Welding Conditions for Second Stage
  Welding current (I): 2.0 to 20.0 kA
  Welding pressure (F): 1.0 to 4.0 kN
  Welding time: 50 to 600 ms
(III) Strength of Steel Material: Above 890 MPa
(III-1) End of Electrode Tip: Diameter: 6 mm or Above, Radius R: Below 75 mm.
  Welding Conditions for First Stage
  Welding current (I): $18.0 \times t_2^{0.5}$ kA or below ($t_2$ indicates the thickness (mm) of the aluminum material
  Welding pressure (F): $1.4 \times I^2 \times 10^{-8}$ kN or below (I indicates current (A))
  Welding time: 150 ms or below
  Welding Conditions for Second Stage
  Welding current (I): 2.0 to 6.0 kA
  Welding pressure (F): 1.0 to 3.5 kN
  Welding time: 50 to 400 ms
(III-2) End of Electrode Tip: Diameter: 6 mm or Above, Radius R: 75 mm or Above and Below 120 mm
  Welding Conditions for First Stage
  Welding current (I): $15.0 \times t_2^{0.5}$ to $30.0 \times t_2^{0.5}$ kA ($t_2$ indicates the thickness (mm) of the aluminum material
  Welding pressure (F): $2.5 \times t_2^{0.5}$ to $4.0 \times t_2^{0.5}$ kN
  Welding time: $100 \times t_2$ ms or below
  Welding Conditions for Second Stage
  Welding current (I): 2.0 to 20.0 kA
  Welding pressure (F): 0.5 t6o 3.5 kN
  Welding time: 50 to 600 ms
(III-3) End of Electrode Tip: Diameter: 6 mm or Above, Radius R: 120 mm or Above
  Welding Conditions for First Stage
  Welding current (I): $15.0 \times t_2^{0.5}$ to $30.0 \times t_2^{0.5}$ kA ($t_2$ indicates the thickness (mm) of the aluminum material
  Welding pressure (F): $2.5 \times t_2^{0.5}$ to $4.0 \times t_2^{0.5}$ kN
  Welding time: $100 \times t_2$ ms or below
  Welding Conditions for Second Stage
  Welding current (I): 2.0 to 20.0 kA
  Welding pressure (F): 1.0 to 4.0 kN
  Welding time: 50 to 600 ms The present invention is characterized in greatly reducing cracks in the nugget by supplying a welding current lower than a welding current supplied at the initial stage of the welding cycle at the terminal stage of the welding cycle to cool the nugget gradually. It was found that forming the nugget in a thickness meeting Expression (1) is effective, as well as controlling the cooling rate at which the nugget is cooled, to surely control the cracking of the nugget.

$$\text{(Smallest thickness of the nugget)/(Thickness of the aluminum material)} \geq 0.3 \quad (1)$$

Figure 10:
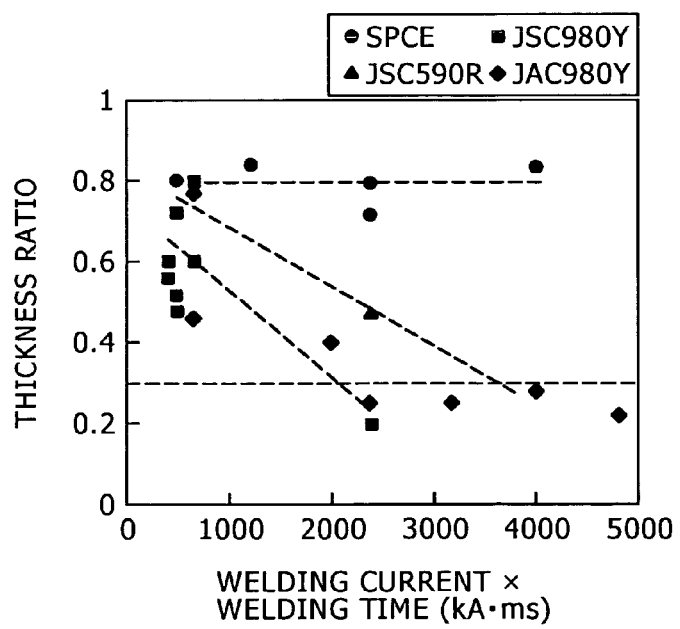
FIG. 10 is a diagram showing, by way of example, spot welding conditions for adjusting thickness ratio.
Figure 13:
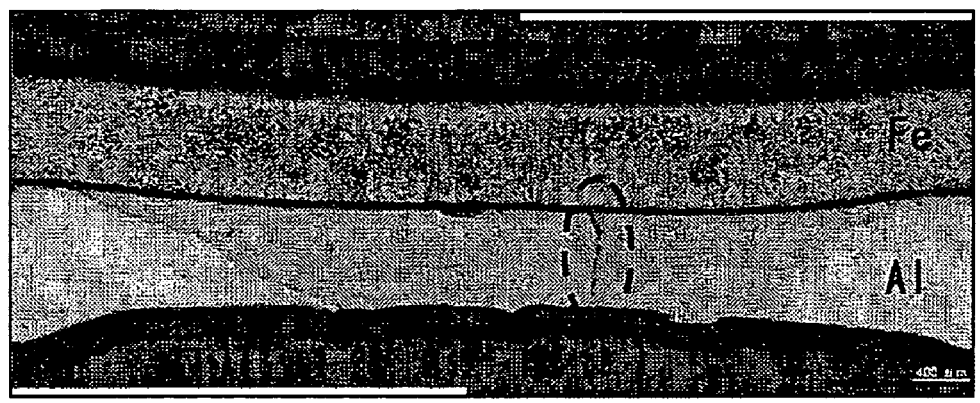
FIG. 13 is a microphotograph of a joint in Example 18 (comparative example)

The nugget cannot satisfactorily absorb a thermal strain produced therein during cooling even if the nugget is cooled gradually when the thickness of the nugget is excessively small relative to the thickness of the aluminum material. Consequently, the nugget cracks easily as shown in FIG. 13. Preferably, the thickness of the nugget meets an inequality: (Smallest thickness of the nugget)/(Thickness of the aluminum material)$\geq 0.4$. Control of welding current and welding time so as to meet Expression (2) obtained from a tendency shown in FIG. 10 by way of example and Expression (3) is effective in forming the nugget in a thickness whose ratio to the thickness of the aluminum material is not smaller than a fixed value.

Suppose that the rounded end of the electrode tip has a diameter of 6 mm or above and a radius R below 75 mm.

Welding current and welding time meet expression (2) when the steel material has a strength of 390 MPa or above and below 890 MPa or meet Expression (3) when the steel material has a strength not lower than 890 MPa.

$$\text{(Welding current (kA))} \times \text{(Welding time (ms))} \leq 4000 \quad (2)$$

$$\text{(Welding current (kA))} \times \text{(Welding time (ms))} \leq 2000 \quad (3)$$

The present invention does not place any restrictions on other welding conditions including the waveform of the welding current, the shape and material of the electrodes and voltage. Other welding conditions may be generally practiced ones. The welding method of the present invention is applicable to fabricating welded materials regardless of the type and thickness of steel materials and aluminum materials. Iron-base materials maybe, for example, pure iron materials, various steel sheets and plated steel sheets. Aluminum materials may be pure aluminum materials and sheets of aluminum alloys of types 2000, 3000, 4000, 5000, 6000 and 7000 specified in International Alloy Standards.

The present invention will be described in terms of examples thereof. The present invention is not limited in its application by the following examples and changes and variations may be made within the scope of the present invention in conformity to the foregoing and the following gist of the present invention.

Example 1

A test steel having a chemical composition (% by mass) shown in Table 1 was melted. A slab of the test steel was rolled to obtain a 1.2 mm thick steel material. The steel material was annealed by a continuous annealing process using temperatures between 500° C. and 1000° C. The annealed steel material was cleaned by water washing or oil washing. The cleaned steel material was tempered to obtain a grade 980 MPa high tensile strength steel material. Commercially available aluminum alloy sheets respectively of 0.1 mm and 1.6 mm in thickness of A6022 (type 6000) were used as test aluminum materials.

The steel material and the aluminum alloy sheets were cut into pieces of the shape of a cross tensile test specimen and the pieces of the steel material and the aluminum alloy sheets were welded together by spot welding to obtain steel-aluminum welded materials. A dc resistance welding tester was used for spot welding. Welding pressures, welding currents and welding times were determined selectively in connection with the respective thicknesses $t_2$ of the aluminum materials. One point of each of the test specimens was welded under welding conditions shown in Table 2. Dome-shaped electrode tips of a Cu—Cr alloy were used. Dimensions of the electrode tips were 50 mmR-12 mmφ for comparative examples shown in Table 3, 150 mmR-5 mmφ for comparative examples shown in Table 4, 100 mmR-12 mmφ for examples and comparative examples shown in Table 5, 150 mmR-12 mmφ for examples and comparative examples shown in Table6, 120 mmR-7 mmφ for examples and comparative examples shown in Table 7, 120 mmR-12 mmφ for examples and comparative examples shown in table 8. The positive electrode was connected to the aluminum material and the negative electrode was connected to the steel material. The positive and the negative electrodes were provided with the electrode tips of the same shape.

A central part of a welded part of each specimen formed by spot welding was cut, the cut specimen was embedded in a resin, the section of the cut specimen was polished and the polished section was observed under an optical microscope. The diameter of the nugget in the section was measured and the area of the nugget was calculated. Two perpendicular diameters of the nugget were measured. A central part of a welded part of a specimen formed by spot welding was cut, the cut specimen was embedded in a resin, the section of the cut specimen was polished and the polished section was observed with a SEM to measure the thickness of an interface reaction layer. A 2000× magnification was used when the thickness of the interface reaction layer was 1 μm or above and a 10000× magnification was used when the thickness of the interface reaction layer was below 1 μm.

A part of the interface reaction layer corresponding to a central part of the nugget 5 had the greatest thickness. The thickness of the interface reaction layer decreased from the part corresponding to the central part of the nugget 5 toward a peripheral part corresponding to the peripheral part of the nugget 5. The diameter of a part of the interface reaction layer having a thickness of 0.5 μm or above and the diameter of a part of the interface reaction layer having a thickness exceeding 10 μm were measured and the respective areas of those parts were calculated. Two perpendicular diameters of the nugget were measured.

The specimens were subjected to a cross tensile strength test to test weld strength. The weld strength of the specimen was evaluated in comparison with the weld strength of 1.0 kN of an A6022-A6022 welded material as a reference weld strength. The specimens having a weld strength not lower than 1.5 kN or having the aluminum material broken during the cross tensile strength test are marked with a double circle, those having a weld strength between 1.0 and 1.5 kN are marked with a circle, those having a weld strength between 0.5 and 1.0 kN are marked with a triangle and those having a weld strength below 0.5 kN are marked with a cross.

The cross tensile strength test was used for evaluating strength because results of a tensile shear strength test are greatly dependent on test conditions. The characteristic of the results of the tensile shear strength test are similar to that of the results of the cross tensile strength test. The specimens respectively having weld strengths determined by the cross tensile strength test and marked with a circle or a double circle had high tensile shear strengths of 2.5 kN or above, respectively.

Tables 3 to 8 show results of the cross tensile strength test of steel-aluminum welded materials fabricated by welding steel materials shown in Table 1 and A6022 aluminum materials. It is known from the comparison of the dimensions of the electrode tips respectively for the examples and the comparative examples shown in Tables 3 to 8 that the weld strength of the steel-aluminum welded material increases when the diameter and the radius R are increased within the ranges specified by the present invention. It is known from the comparison of the spot welding conditions shown in Table 2 for the examples and comparative examples shown in Tables 3 to 8 that the area of the nugget and the area of a part of the interface reaction layer having a thickness in the optimum thickness range between 0.5 and 10 μm are large and hence the weld strength is high when the welding pressure, the welding current and the welding time are controlled so as to be within the corresponding ranges specified by the present invention.

TABLE 1

| Type | Composition (% by mass, Balance: Fe) | | | | |
|---|---|---|---|---|---|
| | C | Si | Mn | P | S |
| 980 MPa High tensile strength steel | 0.175 | 1.40 | 2.00 | 0.014 | 0.002 |

TABLE 2

| Mark | Spot welding conditions | | | Remarks |
|---|---|---|---|---|
| | Welding pressure (kN) | Welding current (kA) | Weld time (ms) | |
| A | 1.5 | 20 | 50 | Comparative example |
| B | 4.5 | 20 | 50 | Comparative example |
| C | 3 | 10 | 50 | Comparative example |
| D | 3 | 25 | 150 | Comparative example |
| E | 2 | 15 | 40 | Example |
| F | 4 | 30 | 20 | Example |
| G | 3 | 20 | 70 | Example |
| H | 3 | 25 | 30 | Example |

TABLE 3

(Comparative example, Electrode tip: 50 mm R, 12 mm Dia.)

| Spot welding conditions | Area of nugget ($\times t_2^{0.5}$ mm$^2$) | | Area of interface reaction layer in optimum thickness range (0.5-1.5 μm) ($\times t_2^{0.5}$ mm$^2$) | | Result of cross tensile test | | Remarks |
|---|---|---|---|---|---|---|---|
| | Thickness $t_2$: 1.0 mm | Thickness $t_2$: 1.6 mm | Thickness $t_2$: 1.0 mm | Thickness $t_2$: 1.6 mm | Thickness $t_2$: 1.0 mm | Thickness $t_2$: 1.6 mm | |
| A | 19 | 0 | 3 | 0 | Δ | x | Comparative example |
| B | 12 | 0 | 2 | 0 | x | x | Comparative example |
| C | 8 | 0 | 5 | 0 | x | x | Comparative example |
| D | 18 | 8 | 3 | 0 | x | x | Comparative example |
| E | 15 | 0 | 5 | 0 | Δ | x | Comparative example |
| F | 19 | 12 | 2 | 2 | x | x | Comparative example |
| G | 12 | 5 | 5 | 0 | x | x | Comparative example |
| H | 17 | 7 | 7 | 1 | x | x | Comparative example |

TABLE 4

(Comparative example, Electrode tip: 150 mm R, 5 mm Dia.)

| Spot welding conditions | Area of nugget ($\times t_2^{0.5}$ mm$^2$) | | Area of interface reaction layer in optimum thickness range (0.5-1.5 μm) ($\times t_2^{0.5}$ mm$^2$) | | Result of cross tensile test | | Remarks |
|---|---|---|---|---|---|---|---|
| | Thickness $t_2$: 1.0 mm | Thickness $t_2$: 1.6 mm | Thickness $t_2$: 1.0 mm | Thickness $t_2$: 1.6 mm | Thickness $t_2$: 1.0 mm | Thickness $t_2$: 1.6 mm | |
| A | 17 | 15 | 10 | 4 | Δ | x | Comparative example |
| B | 15 | 17 | 12 | 11 | Δ | Δ | Comparative example |
| C | 13 | 14 | 2 | 0 | x | x | Comparative example |
| D | 18 | 13 | 3 | 5 | x | x | Comparative example |
| E | 19 | 17 | 8 | 10 | Δ | Δ | Comparative example |
| F | 18 | 17 | 13 | 11 | Δ | Δ | Comparative example |
| G | 19 | 15 | 14 | 13 | Δ | Δ | Comparative example |

TABLE 4-continued (Comparative example, Electrode tip: 150 mm R, 5 mm Dia.)

| Spot welding conditions | Area of nugget ($\times t_2^{0.5}$ mm$^2$) | | Area of interface reaction layer in optimum thickness range (0.5-1.5 μm) ($\times t_2^{0.5}$ mm$^2$) | | Result of cross tensile test | | Remarks |
|---|---|---|---|---|---|---|---|
| | Thickness $t_2$: 1.0 mm | Thickness $t_2$: 1.6 mm | Thickness $t_2$: 1.0 mm | Thickness $t_2$: 1.6 mm | Thickness $t_2$: 1.0 mm | Thickness $t_2$: 1.6 mm | |
| H | 17 | 17 | 12 | 11 | Δ | Δ | Comparative example |

TABLE 5

(Electrode tip: 100 mm R, 12 mm Dia.)

| Spot welding conditions | Area of nugget ($\times t_2^{0.5}$ mm$^2$) | | Area of interface reaction layer in optimum thickness range (0.5-1.5 μm) ($\times t_2^{0.5}$ mm$^2$) | | Result of cross tensile test | | Remarks |
|---|---|---|---|---|---|---|---|
| | Thickness $t_2$: 1.0 mm | Thickness $t_2$: 1.6 mm | Thickness $t_2$: 1.0 mm | Thickness $t_2$: 1.6 mm | Thickness $t_2$: 1.0 mm | Thickness $t_2$: 1.6 mm | |
| A | 19 | 18 | 7 | 3 | Δ | x | Comparative example |
| B | 15 | 14 | 4 | 14 | x | Δ | Comparative example |
| C | 10 | 13 | 3 | 5 | x | x | Comparative example |
| D | 71 | 75 | 4 | 2 | x | x | Comparative example |
| E | 21 | 24 | 12 | 15 | ○ | ○ | Example |
| F | 28 | 29 | 15 | 17 | ○ | ○ | Example |
| G | 47 | 59 | 28 | 25 | ◎ | ◎ | Example |
| H | 32 | 33 | 25 | 26 | ◎ | ◎ | Example |

TABLE 6

(Electrode tip: 150 mm R, 12 mm Dia.)

| Spot welding conditions | Area of nugget ($\times t_2^{0.5}$ mm$^2$) | | Area of interface reaction layer in optimum thickness range (0.5-1.5 μm) ($\times t_2^{0.5}$ mm$^2$) | | Result of cross tensile test | | Remarks |
|---|---|---|---|---|---|---|---|
| | Thickness $t_2$: 1.0 mm | Thickness $t_2$: 1.6 mm | Thickness $t_2$: 1.0 mm | Thickness $t_2$: 1.6 mm | Thickness $t_2$: 1.0 mm | Thickness $t_2$: 1.6 mm | |
| A | 34 | 38 | 11 | 3 | Δ | x | Comparative example |
| B | 18 | 20 | 12 | 15 | Δ | Δ | Comparative example |
| C | 14 | 14 | 3 | 2 | x | x | Comparative example |
| D | 74 | 89 | 6 | 8 | x | x | Comparative example |
| E | 24 | 27 | 17 | 22 | ○ | ○ | Example |
| F | 38 | 40 | 25 | 28 | ◎ | ◎ | Example |
| G | 57 | 64 | 42 | 36 | ◎ | ◎ | Example |
| H | 33 | 39 | 30 | 31 | ◎ | ◎ | Example |

Example 2

A test steel having a chemical composition (% by mass) shown in Table 1 was melted. A slab of the test steel was rolled to obtain a 1.2 mm thick steel material. The steel material was annealed by a continuous annealing process using temperatures between 500° C. and 1000° C. The annealed steel material was cleaned by water washing or oil washing. The cleaned steel material was tempered to obtain a grade 980 MPa high tensile strength steel material. Commercially available aluminum alloy sheets respectively of 0.1 mm (Tables 10, 11 and 12) and 1.6 mm (Table 12) in thickness of A6022 (type 6000) were used as test aluminum material. The steel sheets (steel materials) and the aluminum alloy sheets (aluminum materials) were cut into pieces of the shape of a cross tensile test specimen specified in A3137, JIS, and the pieces of the steel material and the aluminum alloy sheets were welded together by spot welding under welding conditions shown in Table 9 to obtain steel-aluminum welded materials.

A dc resistance welding tester was used for spot welding. The correlation between welding conditions including welding pressure, welding current and welding time and the control of the mean thickness and area of compounds specified by the present invention was examined beforehand. Welding pressures, welding currents and welding times were determined selectively in connection with the respective thicknesses $t_2$ of the aluminum materials. One point of each of the test specimens was welded under welding conditions shown in Table 9. Dome-shaped electrode tips of a Cu—Cr alloy were used. Dimensions of the electrode tips were 50 mmR-12 mmφ for comparative examples shown in Table 10, 120 mmR-12 mmφ for examples and comparative examples shown in Tables 11 and 12 and 150 mmR-12 mmφ for examples and comparative examples shown in Table 13. The positive electrode was connected to the aluminum material and the negative electrode was connected to the steel material. The positive and the negative electrodes were provided with the electrode tips of the same shape. The respective thicknesses and the areas of parts of interface reaction layers having a thickness in the optimum thickness range of the test specimens were measured by the foregoing measuring methods. Measured data is shown in Tables 10 to 13.

The specimens were subjected to a cross tensile strength test to test weld strength. The weld strength of the specimen was evaluated with reference to the weld strength of 1.0 kN of an A2022-A2022 welded material. The specimens having a weld strength above 1.5 kN or having the aluminum material broken during the cross tensile strength test are marked with a double circle, those having a weld strength between 1.0 and 1.5 kN are marked with a circle, those having a weld strength between 0.5 and 1.0 kN are marked with a triangle and those having a weld strength below 0.5 kN are marked with a cross.

Tables 10 to 13 show results of the cross tensile strength test of steel-aluminum welded materials fabricated by spot welding steel materials shown in Table 1 and A6022 aluminum materials. It is known from Tables 10 to 13 that the steel-aluminum welded materials according to the present invention which has a compound layer of $Al_3Fe$ and $Al_{19}Fe_4Si_2Mn$ having a part corresponding to a central part of a nugget and having a means thickness $l_1$ in a range between 0.5 and 10 μm have high weld strength. The steel-aluminum welded materials according to the present invention formed by controlling the mean thickness $l_2$ of a part of the compound layer of $Al_5Fe_2$ corresponding to the central part of the nugget and the area $S_1$ of a part of the compound layer of $Al_3Fe$ and $Al_{19}Fe_4Si_2Mn$ having a thickness in the optimum thickness range in addition to controlling the mean thickness $l_1$ of the compound layer of $Al_3Fe$ and $Al_{19}Fe_4Si_2Mn$ and the area $S_2$ of the compound layer of $Al_5Fe_2$ have the highest weld strengths as compared with other steel-aluminum welded materials according to the present invention. Such welding conditions are indicated at E, F and G in Tables 11 to 13. Steel-aluminum welded materials in comparative examples in Tables 10 to 13 not meeting requirements of the present invention have low weld strengths. The respective mean thicknesses $l_1$ of the compound layers of $Al_3Fe$ and $Al_{19}Fe_4Si_2Mn$ of the steel-aluminum welded materials in comparative examples shown in Tables 10 to 13 are outside the optimum thickness range.

The nuggets of many steel-aluminum welded materials in comparative examples had areas outside the recommended range. For example, the nuggets of the steel-aluminum welded materials in comparative examples shown in Table 10 welded by using the 50 mmR-12 mmφ electrode tips had small areas in a range between $12\ t_2^{0.5}$ and $19\ t_2^{0.5}$ mm² and the nuggets of the steel-aluminum welded materials in comparative examples shown in Tables 11 and 12 welded by using the 120 mmR-12 mmφ electrode tips and those shown in Table 13 formed by using the 150 mmR-12 mmφ electrode tips under welding conditions B had small areas in a range between $17\ t_2^{0.5}$ and $20\ t_2^{0.5}$ mm². The nuggets of the steel-aluminum welded materials in comparative examples shown in Tables 11 and 12 welded by using the 120 mmR-12 mmφ electrode tips and those shown in Table 13 formed by using the 150 mmR-12 mmφ electrode tips under welding conditions C had large areas in a range between $72\ t_2^{0.5}$ and $89\ t_2^{0.5}$ mm². The nuggets of all the steel-aluminum materials in examples had areas within the above-mentioned recommended range. It is desirable that the areas of nuggets according to the present invention have areas in a range between $20\ t_2^{0.5}$ and $70\ t_2^{0.5}$ mm². Although the nuggets of the steel-aluminum welded materials in comparative examples shown in Tables 11 and 12 welded by using the 120 mmR-12 mmφ electrode tips and those shown in Table 13 formed by using the 150 mmR-12 mmφ electrode tips under welding conditions A had areas in a range between $28\ t_2^{0.5}$ and $38\ t_2^{0.5}$ mm² and had diameters substantially equal to those of the nuggets of the steel-aluminum materials in examples formed under the welding conditions D, E and G, those steel-aluminum materials in comparative examples has low weld strengths. Although the nugget needs to have an area larger than a certain threshold area as mentioned above, it is more important to control the thickness and structure of the interface reaction layer.

The aluminum materials of all the steel-aluminum welded materials in examples and comparative examples were similar in thickness reduction and the remaining parts of the aluminum materials had the smallest thicknesses Δt of 50% of the original thicknesses thereof or above.

TABLE 7

(Electrode tip: 120 mm R, 7 mm Dia.)

| Spot welding conditions | Area of nugget ($\times t_2^{0.5}$ mm$^2$) Thickness $t_2$: 1.0 mm | Area of nugget ($\times t_2^{0.5}$ mm$^2$) Thickness $t_2$: 1.6 mm | Area of interface reaction layer in optimum thickness range (0.5-1.5 μm) ($\times t_2^{0.5}$ mm$^2$) Thickness $t_2$: 1.0 mm | Area of interface reaction layer in optimum thickness range (0.5-1.5 μm) ($\times t_2^{0.5}$ mm$^2$) Thickness $t_2$: 1.6 mm | Result of cross tensile test Thickness $t_2$: 1.0 mm | Result of cross tensile test Thickness $t_2$: 1.6 mm | Remarks |
|---|---|---|---|---|---|---|---|
| A | 20 | 23 | 10 | 5 | Δ | x | Comparative example |
| B | 15 | 19 | 10 | 10 | Δ | Δ | Comparative example |
| C | 14 | 15 | 2 | 3 | x | x | Comparative example |
| D | 35 | 39 | 6 | 8 | x | x | Comparative example |
| E | 21 | 24 | 14 | 20 | ○ | ○ | Example |
| F | 32 | 37 | 26 | 28 | ⊚ | ⊚ | Example |
| G | 37 | 38 | 26 | 29 | ⊚ | ⊚ | Example |
| H | 32 | 35 | 26 | 27 | ⊚ | ⊚ | Example |

TABLE 8

(Electrode tip: 120 mm R, 12 mm Dia.)

| Spot welding conditions | Area of nugget ($\times t_2^{0.5}$ mm$^2$) Thickness $t_2$: 1.0 mm | Area of nugget ($\times t_2^{0.5}$ mm$^2$) Thickness $t_2$: 1.6 mm | Area of interface reaction layer in optimum thickness range (0.5-1.5 μm) ($\times t_2^{0.5}$ mm$^2$) Thickness $t_2$: 1.0 mm | Area of interface reaction layer in optimum thickness range (0.5-1.5 μm) ($\times t_2^{0.5}$ mm$^2$) Thickness $t_2$: 1.6 mm | Result of cross tensile test Thickness $t_2$: 1.0 mm | Result of cross tensile test Thickness $t_2$: 1.6 mm | Remarks |
|---|---|---|---|---|---|---|---|
| A | 28 | 30 | 10 | 3 | Δ | x | Comparative example |
| B | 17 | 18 | 10 | 15 | Δ | Δ | Comparative example |
| C | 13 | 14 | 4 | 3 | x | x | Comparative example |
| D | 72 | 85 | 5 | 6 | x | x | Comparative example |
| E | 23 | 25 | 15 | 20 | ○ | ○ | Example |
| F | 35 | 36 | 23 | 25 | ⊚ | ⊚ | Example |
| G | 54 | 63 | 40 | 33 | ⊚ | ⊚ | Example |
| H | 33 | 40 | 29 | 32 | ⊚ | ⊚ | Example |

TABLE 9

Spot welding conditions

| Mark | Welding pressure (kN) | Welding current (kA) | Weld time (ms) |
|---|---|---|---|
| A | 1.5 | 20 | 50 |
| B | 3 | 10 | 50 |
| C | 3 | 25 | 150 |
| D | 2 | 15 | 40 |
| E | 4 | 30 | 20 |
| F | 3 | 20 | 70 |
| G | 3 | 25 | 30 |

TABLE 10

(Electrode tip: 50 mm R, 12 mm Dia., Thickness $t_2$: 1.0 mm)

| Spot welding conditions | $Al_3Fe + Al_{19}Fe_4Si_2Mn$ compound layer | | $Al_5Fe_2$ compound layer | | Results of cross tensile test | Remarks |
|---|---|---|---|---|---|---|
| | Central mean thickness $l_1$ (μm) | Area $S_1$ of part in optimum thickness range ($\times t_2^{0.5}$ mm$^2$) | Central mean thickness $l_2$ (μm) | Area $S_2$ of part in optimum thickness range ($\times t_2^{0.5}$ mm$^2$) | | |
| A | 11.5 | 3 | 4.9 | 3 | Δ | Comparative example |
| B | — | — | — | — | x | Comparative example |
| C | 22.4 | 3 | 7.3 | 2 | x | Comparative example |
| D | 0.4 | 0 | 0.5 | <1 | Δ | Comparative example |
| E | 15.3 | 2 | 6.5 | 2 | x | Comparative example |
| F | 14.2 | 8 | 3.7 | 6 | x | Comparative example |
| G | 10.2 | 10 | 4.9 | 8 | x | Comparative example |

Note:
Cross (X) indicates unwelded state

TABLE 11

(Electrode tip: 120 mm R, 12 mm Dia., Thickness $t_2$: 1.0 mm)

| Spot welding conditions | $Al_3Fe + Al_{19}Fe_4Si_2Mn$ compound layer | | $Al_5Fe_2$ compound layer | | Results of cross tensile test | Remarks |
|---|---|---|---|---|---|---|
| | Central mean thickness $l_1$ (μm) | Area $S_1$ of part in optimum thickness range ($\times t_2^{0.5}$ mm$^2$) | Central mean thickness $l_2$ (μm) | Area $S_2$ of part in optimum thickness range ($\times t_2^{0.5}$ mm$^2$) | | |
| A | 10.7 | 10 | 3.1 | 5 | □ | Comparative example |
| B | 0.4 | 0 | 0.6 | 2 | x | Comparative example |
| C | 13.3 | 5 | 3.6 | 4 | x | Comparative example |
| D | 3.3 | 15 | 0.8 | 12 | ○ | Example |
| E | 9.8 | 31 | 4.9 | 23 | □ | Example |
| F | 7.4 | 27 | 3.7 | 24 | □ | Example |
| G | 8.3 | 25 | 3.5 | 20 | □ | Example |

Example 3

A test steel having chemical compositions (% by mass) shown in Table 14 was melted. A slab of the test steel was rolled to obtain a 1.2 mm thick steel material. The steel material was annealed by a continuous annealing process using temperatures between 800° C. and 900° C. The annealed steel material was cleaned by water washing or oil washing. The cleaned steel material was tempered to adjust the strength of the steel material to a desired strength. A commercially available 1 mm thick A1050 aluminum alloy sheet containing 0.05% Si and not containing Mn and a commercially available 1 mm thick A6022 aluminum alloy sheet containing 1.10% Si and 0.07% Mn were used as test aluminum materials. The steel sheets (steel materials) and the aluminum alloy sheets (aluminum materials) were cut into pieces of the shape of a cross tensile test specimen specified in A3137, JIS, and the pieces of the steel sheets and the aluminum alloy sheets were welded together by spot welding to obtain steel-aluminum welded materials.

A dc resistance welding tester was used for spot welding. One point of each of the test specimens was welded under welding conditions of G and H shown in Table 9. Dome-shaped 120 mmR-12 mmφ electrode tips of a Cu—Cr alloy were used. The positive electrode was connected to the aluminum material and the negative electrode was connected to the steel material.

Parts of the aluminum materials of the specimens remained after spot welding had smallest thicknesses Δt of 50% of the original thicknesses thereof or above. A central part of a welded part of each specimen formed by spot welding was cut, the cut specimen was embedded in a resin, the section of the cut specimen was polished and the polished section was observed under an optical microscope to determine the smallest thickness Δt.

Test specimens for Si and Mn content measurement similar to those for smallest thicknesses measurement were prepared. The Si content and the Mn content of each specimen were determined through the measurement of secondary ion intensities by a SIMS (ims5f, CAMECA). Oxygen ions with energy of 8 kV were used as primary ions. A small spot of 50 μm sq. including an interface in a joint was bombarded with a beam of oxygen ions and positive secondary ions sputtered form the specimen were detected for the linear analysis of secondary ions of Mn and Si in a direction perpendicular to the interface of the joint. The measurement was repeated three times. The ratios of the Mn secondary ion intensity and the Si secondary ion intensity in a middle part of the interface reaction layer respectively to the Mn secondary ion intensity and the Si secondary ion intensity in the aluminum material and the steel material were determined as a Mn content ratio and a Si content ratio, respectively. The mean Mn content ratio and the mean Si content ratio were calculated.

Results of the cross tensile strength test of steel-aluminum welded materials obtained by spot welding steel materials shown in Table 14 and the above-mentioned aluminum materials are shown in Tables 15 and 16.

It is obvious from Tables 15 and 16 that weld strengths of joints are low when the tensile strength of the steel material is below 400 MPa and that the steel material needs to have a tensile strength of 400 MPa or above desirably, 500 MPa or above, to form joints respectively having high weld strengths. Joints having a high weld strength cannot be formed regardless of spot welding conditions when the steel material has a low C content, a low Mn content, a low Si content and low strength like the mild steel material (SPCE) shown in Tables 15 and 16.

It is known from Tables 15 and 16 that even if the steel material has a sufficiently high tensile strength or even if the steel material has the foregoing desired composition, the weld strength is low when the area of a part of the interface reaction layer of a thickness between 0.5 and 10.5 μm is outside the desired area range specified by the present invention. It is known from Tables 15 and 16 also that a joint having a high weld strength can be formed when the nugget has a diameter in the desired range, a part of the interface reaction layer of a thickness between 0.5 and 10.5 μm is within the desired area range and the interface reaction layer has a high Mn content ratio and a high Si content ratio.

When the aluminum material has a low Si content like the A1050 aluminum alloy sheet shown in Tables 15 and 16, the weld strength of a joint cannot be increased beyond a certain limit regardless of the spot welding conditions.

TABLE 12

(Electrode tip: 120 mm R, 12 mm Dia., Thickness $t_2$: 1.6 mm)

| Spot welding conditions | $Al_3Fe + Al_{19}Fe_4Si_2Mn$ compound layer | | $Al_5Fe_2$ compound layer | | Results of cross tensile test | Remarks |
|---|---|---|---|---|---|---|
| | Central mean thickness $l_1$ (μm) | Area $S_1$ of part in optimum thickness range ($\times t_2^{0.5}$ mm$^2$) | Central mean thickness $l_2$ (μm) | Area $S_2$ of part in optimum thickness range ($\times t_2^{0.5}$ mm$^2$) | | |
| A | 10.1 | 3 | 1.4 | 2 | Δ | Comparative example |
| B | — | — | — | — | x | Comparative example |
| C | 11.9 | 5 | 1.2 | 3 | x | Comparative example |
| D | 1.4 | 9 | 0.6 | 8 | ○ | Example |
| E | 8.8 | 23 | 4.5 | 18 | ◉ | Example |
| F | 5.9 | 28 | 2.8 | 21 | ◉ | Example |
| G | 6.1 | 27 | 2.9 | 24 | ◉ | Example |

TABLE 13

(Electrode tip: 150 mm R, 12 mm Dia., Thickness $t_2$: 1.0 mm)

| Spot welding conditions | $Al_3Fe + Al_{19}Fe_4Si_2Mn$ compound layer | | $Al_5Fe_2$ compound layer | | Results of cross tensile test | Remarks |
|---|---|---|---|---|---|---|
| | Central mean thickness $l_1$ (μm) | Area $S_1$ of part in optimum thickness range ($\times t_2^{0.5}$ mm$^2$) | Central mean thickness $l_2$ (μm) | Area $S_2$ of part in optimum thickness range ($\times t_2^{0.5}$ mm$^2$) | | |
| A | 10.5 | 11 | 2.9 | 8 | Δ | Comparative example |
| B | 0.4 | <1 | 0.3 | 1 | x | Comparative example |
| C | 11.8 | 8 | 3.0 | 4 | x | Comparative example |

TABLE 13-continued (Electrode tip: 150 mm R, 12 mm Dia., Thickness $t_2$: 1.0 mm)

| Spot welding conditions | $Al_3Fe + Al_{19}Fe_4Si_2Mn$ compound layer | | $Al_5Fe_2$ compound layer | | Results of cross tensile test | Remarks |
|---|---|---|---|---|---|---|
| | Central mean thickness $l_1$ (μm) | Area $S_1$ of part in optimum thickness range ($\times t_2^{0.5}$ mm²) | Central mean thickness $l_2$ (μm) | Area $S_2$ of part in optimum thickness range ($\times t_2^{0.5}$ mm²) | | |
| D | 1.8 | 18 | 0.7 | 14 | ○ | Example |
| E | 8.0 | 27 | 4.1 | 25 | ◎ | Example |
| F | 6.9 | 44 | 3.2 | 29 | ◎ | Example |
| G | 6.8 | 35 | 2.9 | 30 | ◎ | Example |

TABLE 14

| | C | Si | Mn | P | S | Remarks |
|---|---|---|---|---|---|---|
| SPCE | 0.01 | 0.02 | 0.15 | 0.011 | 0.006 | Comparative example |
| 440 MPa High tensile strength steel | 0.14 | 0.03 | 0.91 | 0.01 | 0.003 | |
| 590 MPa High tensile strength steel | 0.057 | 0.51 | 1.18 | 0.008 | 0.003 | |
| 980 MPa High tensile strength steel | 0.175 | 1.38 | 1.98 | 0.014 | 0.002 | |

Example 4

A test steel having a chemical composition having a C content (0.1C-2.3Mn-0.2Cr-0.32Mo) was melted. A slab of the test steel was rolled to obtain a 1.2 mm thick steel material. The steel material was annealed by a continuous annealing process using temperatures between 500° C. and 1000° C. The annealed steel material was cleaned by water washing or oil washing. The cleaned steel material was tempered to adjust the strength of the steel material to a desired strength of 980MPa. A commercially available 1 mm thick A6022-T4 aluminum alloy sheet having a Si content of 1.01% by mass, a Mn content of 0.07% by mass and a Mg content of 0.6% by mass was used as a test aluminum material.

The steel material was plated with Zn. The steel material was immersed in a 10% sulfuric acid solution for 5 min for acid cleaning and activation. The acid-cleaned steel material was plated by different plating processes under the following plating conditions. A Zn-electroplating process used a Zn-plating path of pH3 prepared by mixing 400 g/l of zinc sulfate, 30 g/l of aluminum sulfate, 15 g/l of sodium chloride 30 g/l of boric acid and sulfuric acid. The steel material was immersed in the plating bath and a current was supplied in 20 A/dm² to coat the steel material with a 10 μm thick Zn film. A Zn-10% Ni plating process used a plating bath prepared by adding nickel sulfate and nickel chloride to the plating bath used by the Zn-electroplating process. The steel material was immersed in the plating bath and a current was supplied in 10 A/dm² to coat the steel material with a 10 μm thick Zn-10% Ni film. A steel material in a comparative example was plated with a 10 μm thick Ni film by immersing the steel material in a Watts bath and supplying a current in 10 A/dm².

The steel materials were coated with a 10 μm thick Al film, a 10 μm thick Al-9% Si film, 10 μm thick Zn—Fe films (Fe contents: 5, 8, 10 and 15%) by hot dipping processes using different types of molten metals. The Zn-10% Fe hot dipping process adjusted the Fe content and temperature of the molten metals and pull temperature to form films of 1, 3, 10, 15 and 20 μm in thickness. The aluminum material was plated with Zn. The aluminum material was immersed in a 10% nitric acid solution for 30 s for acid cleaning. The acid-cleaned aluminum material was immersed in a plating bath containing 500 g/l of sodium hydrate, 100 g/l of zinc oxide, 1 g/l of ferric chloride and 10 g/l of Rochelle salt for 30 s for zincate conversion. Then, the aluminum material was plated with Zn (containing a Zn alloy) by an electroplating process. A sample of each of the plated material was cut, the cut sample was embedded in a resin and polished and the polished section of the sample was observed under a SEM at a 2000× magnification. Thicknesses of three points on the sample were measured and the mean thickness was calculated. The steel sheets (steel materials) and the aluminum alloy sheets (aluminum materials) were cut into pieces of the shape of a cross tensile test specimen specified in A3137, JIS, and the pieces of the steel sheets and the aluminum alloy sheets were welded together by spot welding to obtain a steel-aluminum welded material.

The spot welding was carried out by three welding processes 1, 2 and 3 using welding currents (kA) and welding times (ms) shown in Table 17. One point of each of the test specimens was welded. The welding processes 2 and 3 are a high-current process and a low-current process, respectively. The plating processes 1 to 3 used the same welding pressure. A dc resistance welding tester was used. Dome-shaped 120mmR-12 mmϕ electrode tips of a Cu—Cr alloy were used. The positive electrode was connected to the aluminum material and the negative electrode was connected to the steel material. The aluminum-steel welded material was evaluated in terms of the area of the nugget, the area of a part of the interface reaction layer having a thickness between 0.5 and 10.5 μm, weld strength and corrosion resistance. Measured results are shown in Table 18.

The weld strength was measured by the measuring method mentioned above. The interface reaction layer is a layer of a compound of Fe and Al having Fe and Al contents of 1% by weight or above and Zn and Ni contents lower than the Fe and Al contents as determined by EDX analysis. A layer having Fe and Al contents below 1% by weight and Zn and Ni contents higher than either of the Fe and Al contents was regarded as a deposited layer and was not regarded as an interface reaction layer.

The respective weld strength of the joints of the steel-aluminum welded material was evaluated by the method mentioned above.

Results of corrosion resistance tests shown in Table 18 were obtained by subjecting steel-aluminum welded material formed by spot welding to corrosion resistance tests. The steel-aluminum welded material was processed by a zinc phosphate coating process and a coating process to simulate the performance of the steel-aluminum welded material as automotive parts or the like. Each steel-aluminum welded material was degreased by an alkaline degreasing process, was cleaned by a water washing process and was treated with a solution of 1% Surffine 5N-10 (Nippon Paint Co., Ltd.) for 30 s by a surface treatment process. Then, the steel-aluminum welded material was immersed for 2 min in a 50° C. zinc phosphate bath containing 1.0 g/l zinc ions, 1.0 g/l nickel ions, 0.8 g/l manganese ions, 15.0 g/l phosphoric acid ions, 6.0 g/l nitric acid ions and 0.12 g/l nitrous acid ions and having a toner value of 2.5 pt, a total acidity of 22 pt and an acidity in a range between 0.3 and 0.5 pt for a zinc phosphate treatment. The steel-aluminum welded material treated by the zinc phosphate treatment was coated with a cationic electrode-position coating material (Powertop V50, gray, Nippon Paint Co., Ltd.), and then the coated steel-aluminum welded material was baked at 170° C. for 25 min to form a 30 μm thick coating film.

The specimens of the coated steel-aluminum welded material was subjected to a combined corrosion test to evaluate the corrosion resistance of the steel-aluminum welded material. The combined corrosion test repeated a test cycle including 2 h of a salt water spray period, 2 h of a drying period and 2 h of a wetting period 100 times. The steel and the aluminum material of the thus tested steel-aluminum welded material were separated at the joint and a maximum depth of corrosion in the aluminum material was measured. The corrosion resistance of the steel-aluminum welded material was indicated by a circle, a triangle and a cross when the maximum depth of corrosion is below 0.01 mm, between 0.01 and 0.1 mm and 0.1 mm or above, respectively.

Table 19 shows the effect of plating conditions on weld strength when either of the steel material and the aluminum material was plated by various plating methods. More concretely, Table 19 shows the condition and weld strength of welded parts formed by welding together grade 980 MPa high tensile strength steel material plated respectively by different plating methods and an A6022 aluminum alloy sheet by spot welding under an optimum welding condition I according to the present invention shown in Table 17.

It is known from data on the steel-aluminum welded material in Comparative example 1 shown in Table 19 that a steel-aluminum welded material has a low weld strength determined by a cross tensile strength test and is unsatisfactory in corrosion resistance even if the steel material and the aluminum material are welded under the optimum welding condition unless either of the steel material and the aluminum material is plated. The steel materials or the aluminum materials of the steel-aluminum welded materials in Examples 3, 4, 7 to 10 and 12 to 14 of the present invention are coated respectively with deposited films of Zn and/or Al having a thickness between 3 and 15 μm and a melting point between 350° C. and 950° C. before spot welding. Each of these steel-aluminum welded materials has a nugget of a comparatively large area, an interface reaction layer of an optimum thickness and a joint having a high weld strength. The remaining part of the aluminum material of each of these steel-aluminum welded materials is comparatively thick. A thickness reduction of the aluminum material of each of these steel-aluminum welded materials is small, which indicates that splash is suppressed.

The steel materials or the aluminum materials of the steel-aluminum welded materials in Comparative examples 2, 5, 6, 11, 15 and 16 are coated with deposited films of Ni, Zn and/or Al, respectively. However, the thicknesses and melting points of those deposited films are outside the thickness and the melting point range specified by the present invention. Although nuggets respectively of comparatively large areas are formed in the steel-aluminum welded materials in Comparative examples 2, 5, 6, and 16 provided with the deposited films respectively having excessively high melting points, interface reaction layers are formed scarcely therein even if those steel-aluminum welded materials are formed by spot welding under an optimum condition. Consequently, joints of the steel-aluminum welded materials in those comparative examples have very low weld strengths, respectively, the remaining parts of the aluminum materials have comparatively small minimum thicknesses, respectively, and a thickness reduction of the thickness of the aluminum material of each of these steel-aluminum welded materials is comparatively large.

The steel-aluminum welded material in Comparative example 11 formed by spot welding under the optimum condition and provided with an excessively thin deposited film, similarly to the steel-aluminum welded material in Comparative example 1, is unsatisfactory in weld strength and in corrosion resistance. Although the steel-aluminum welded material in Comparative example 15 provided with an excessively thick deposited film has a nugget of a comparatively big diameter, an interface reaction layer is formed scarcely in the same steel-aluminum welded material and hence the joint of this steel-aluminum welded material has a very low weld strength. The remaining part of the aluminum material of this steel-aluminum welded material is comparatively thin and the thickness reduction is comparatively large.

As obvious from the data shown above, the present invention is capable of forming a steel-aluminum welded material having joints having high weld strength by welding together a steel material and an aluminum material by spot welding in satisfactory repeatability without causing troubles including increase in the reduction of the thickness of the aluminum material. The critical significance of the factors including the melting point, the composition and the thickness of the deposited film deposited on the steel material and the aluminum material of the steel-aluminum welded material of the present invention is known from the data shown above.

Table 18 shows the effect of the spot welding conditions A to I shown in Table 17 on weld strength. More concretely, Table 18 shows the condition and weld strength of welded parts of steel-aluminum welded materials formed by welding together a steel material coated with a 10 μm thick Zn-10% Fe film by hot dipping, and the foregoing aluminum materials by spot welding under the welding conditions A to I shown in Table 17.

It is known from Table 18 that joints having a high weld strength can be formed by spot welding under the optimum welding conditions H and I each including a high current mode and a low current mode.

TABLE 15

Welding condition G

| Type of steel | Type of aluminum | Area of nugget (mm²) | Area of interface reaction layer in optimum thickness range (0.5-1.5 μm) (mm²) | Mn content ratio with steel | Mn and Si contents of interface reaction layer — Si content ratio Steel | Mn and Si contents of interface reaction layer — Si content ratio Aluminum | Result of cross tensile test | Remarks |
|---|---|---|---|---|---|---|---|---|
| SPCE | 6022 | 48 | 9 | 1.6 | 30.0 | 0.6 | x | Comparative example |
| 590 MPa | 1050 | 51 | 21 | 0.8 | 0.9 | 9.0 | ○ | Example |
| 440 MPa | 6022 | 50 | 27 | 1.5 | 43.3 | 1.3 | ◎ | Example |
| 980 MPa | 6022 | 54 | 40 | 1.5 | 1.4 | 1.9 | ◎ | Example |

TABLE 16

Welding condition H

| Type of steel | Type of aluminum | Area of nugget (mm²) | Area of interface reaction layer in optimum thickness range (0.5-1.5 μm) (mm²) | Mn Content ratio with steel | Mn and Si Contents of interface reaction layer — Si Content ratio Steel | Mn and Si Contents of interface reaction layer — Si Content ratio Aluminum | Result of cross tensile test | Remarks |
|---|---|---|---|---|---|---|---|---|
| SPCE | 6022 | 30 | 7 | 1.9 | 40.0 | 0.8 | x | Comparative example |
| 590 MPa | 1050 | 34 | 10 | 2.2 | 1.3 | 13.0 | ◎ | Example |
| 440 MPa | 6022 | 31 | 16 | 1.6 | 36.7 | 1.1 | ◎ | Example |
| 980 MPa | 6022 | 33 | 29 | 2.0 | 1.7 | 2.4 | ◎ | Example |

TABLE 17

| | Welding process 1 | Welding process 2 (High current mode) | Welding process 3 (Low current mode) | Welding pressure (kN) | Remarks |
|---|---|---|---|---|---|
| A | 6 kA-200 msec | 20 kA-200 msec | 8 kA-500 msec | 1.5 | Comparative example |
| B | | 12 kA-500 msec | 6 kA-500 msec | 3 | Comparative example |
| C | | 40 kA-150 msec | 3 kA-500 msec | 3 | Comparative example |
| D | | 25 kA-200 msec | 0.5 kA-400 msec | 2 | Comparative example |
| E | 6 kA-200 msec | 25 kA-200 msec | 15 kA-700 msec | 4 | Comparative example |
| F | | 25 kA-200 msec | 6 kA-80 msec | 2 | Comparative example |
| G | | 25 kA-200 msec | 8 kA-2000 msec | 4 | Comparative example |
| H | 6 kA-200 msec | 25 kA-200 msec | 1 kA-1000 msec | 3 | |
| I | | 25 kA-200 msec | 8 kA-400 msec | 3 | |

Example 5

Figure 11A:
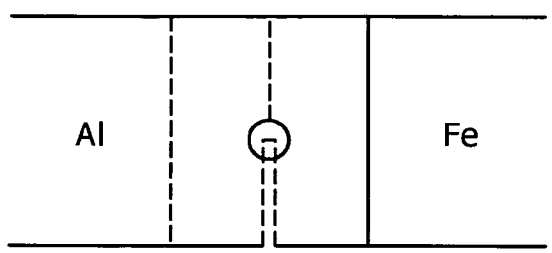
FIGS. 11(a) and 11(b) are a top view and a side elevation, respectively, of assistance in explaining a method of measuring the temperature of a nugget.
Figure 11B:
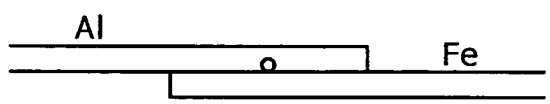
Figure 12:
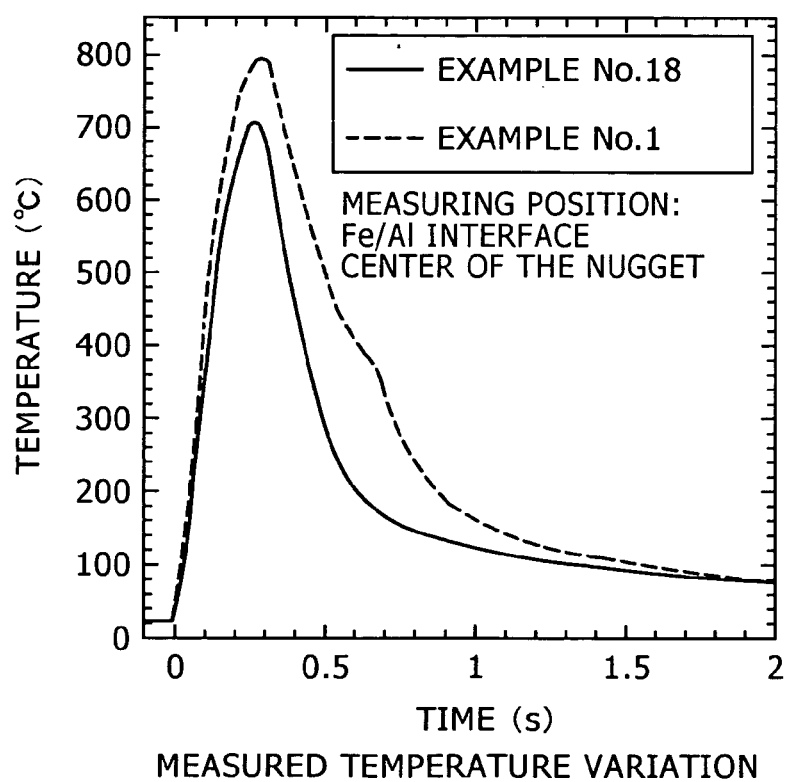
FIG. 12 is a graph showing the variation of temperature in examples.

Steel materials and aluminum materials shown in Table 20 were superposed and welded together by spot welding under welding conditions shown in Table 20 and mentioned below. Temperature of a middle part, with respect to thickness, of each of nuggets formed in steel-aluminum welded materials in Examples 1 and 18 was measured by a measuring method illustrated in FIG. 11 to determine the thermal history of the nuggets. A groove is formed in the joining surface of the aluminum material as shown in FIG. 11(b) to insert a thermocouple between the steel material and the aluminum material. The thermocouple was inserted through the groove to place the thermocouple at a position corresponding to a middle part of a nugget to be formed as shown in FIG. 11(*a*). Then, the steel material and the aluminum material were welded together by spot welding, while the temperature of the nugget was measured. FIG. 12 shows the variation of the measured temperature of each of nuggets formed in the steel-aluminum welded material. Cooling rates shown in Table 21 are average cooling rates during cooling from 600° C. to 200° C.

Welder: Single-Phase Rectifier-Type Resistance Spot Welder

Shape of Electrode:

Positive electrode: Dome-shaped 1% Cr—Cu electrode having a rounded end of 6 mm in diameter rounded in 40 mmR Negative electrode: Dome-shaped 1% Cr—Cu electrode having a rounded end of 6 mm in diameter rounded in 40 mmR Radius of dome sphere: 8 mm Each of joints thus formed was cut and a section of the joint was observed to measure a minimum thickness of a nugget formed in the aluminum material. The section of the joint was observed under an optical microscope at a 25× magnification to see whether or not any cracks are formed in the nugget. Three specimens of each of the steel-aluminum material in examples were examined. Nuggets having even one crack are marked with a cross and those not having any crack at all are marked with a circle. Table 22 shows results of measurement and examination.

TABLE 18

| | Area of nugget (mm$^2$) | Area of optimum interface reaction layer (mm$^2$) | Result of cross tensile test | Remarks |
|---|---|---|---|---|
| A | 41 | 3 | x | Comparative example |
| B | 18 | 2 | x | Comparative example |
| C | 79 | 15 | x | Comparative example |
| D | 40 | 6 | Δ | Comparative example |
| E | 74 | 12 | Δ | Comparative example |
| F | 62 | 8 | Δ | Comparative example |
| G | 36 | 5 | Δ | Comparative example |
| H | 40 | 30 | ◯ | Example |
| I | 42 | 36 | ⊚ | Example |

TABLE 19

| | Quality of plated film | Plating method | Base material | Thickness (μm) | Melting point (° C.) | Area of nugget (mm$^2$) | Area of optimum interface reaction layer (mm$^2$) | Result of cross tensile test | Result of corrosion test | Remarks |
|---|---|---|---|---|---|---|---|---|---|---|
| 1 | Not plated | — | — | — | — | 42 | 5 | x | x | Comparative example |
| 2 | Ni | Electroplating | Steel | 10 | 1450 | 49 | 0 | x | x | Comparative example |
| 3 | Zn | Electroplating | Steel | 10 | 420 | 41 | 13 | ◯ | ◯ | Example |
| 4 | Zn | Electroplating | Aluminum | 10 | 420 | 40 | 18 | ◯ | Δ | Example |
| 5 | Zn-10% Ni | Electroplating | Steel | 10 | ≑1050 | 48 | 0 | x | ◯ | Comparative example |
| 6 | Zn-10% Ni | Electroplating | Aluminum | 10 | ≑1050 | 49 | 0 | x | x | Comparative example |
| 7 | Al | Hot dipping | Steel | 10 | 650 | 45 | 17 | ◯ | ◯ | Example |
| 8 | Al-9% Si | Hot dipping | Steel | 10 | 600 | 44 | 20 | ⊚ | ◯ | Example |
| 9 | Zn-5% Fe | Hot dipping | Steel | 10 | ≑550 | 41 | 14 | ◯ | ◯ | Example |
| 10 | Zn-8% Fe | Hot dipping | Steel | 10 | ≑700 | 40 | 25 | ⊚ | ◯ | Example |
| 11 | Zn-10% Fe | Hot dipping | Steel | 10 | ≑850 | 44 | 9 | x | x | Comparative example |
| 12 | Zn-10% Fe | Hot dipping | Steel | 3 | ≑850 | 43 | 20 | ⊚ | ◯ | Example |
| 13 | Zn-10% Fe | Hot dipping | Steel | 10 | ≑850 | 42 | 36 | ⊚ | ◯ | Example |
| 14 | Zn-10% Fe | Hot dipping | Steel | 15 | ≑850 | 40 | 10 | ⊚ | ◯ | Example |
| 15 | Zn-10% Fe | Hot dipping | Steel | 20 | ≑850 | 40 | 3 | x | ◯ | Comparative example |
| 16 | Zn-15% Fe | Hot dipping | Steel | 10 | ≑1000 | 48 | 0 | x | ◯ | Comparative example |

TABLE 20

| | | | | | Spot welding conditions | | | | | |
|---|---|---|---|---|---|---|---|---|---|---|
| | | Fe | | Al | | First stage | | | Second stage | | |
| No. | Type | Thickness (mm) | Type | Thickness (mm) | Welding pressure (kN) | Welding current (kA) | Weld time (ms) | Welding pressure (kN) | Welding current (kA) | Weld time (ms) | Remarks |
| 1 | Mild steel | 0.8 | 6022 | 1.0 | 1.5 | 12 | 200 | 1.5 | 6 | 400 | Example |
| 2 | Mild steel | 0.8 | 6022 | 1.5 | 2.5 | 12 | 150 | 2.0 | 3 | 550 | Example |

TABLE 20-continued

| | | | | | First stage | | | Second stage | | | |
|---|---|---|---|---|---|---|---|---|---|---|---|
| | Fe | | Al | | Welding | Welding | Weld | Welding | Welding | Weld | |
| No. | Type | Thickness (mm) | Type | Thickness (mm) | pressure (kN) | current (kA) | time (ms) | pressure (kN) | current (kA) | time (ms) | Remarks |
| 3 | Mild steel | 0.8 | 5023 | 1.0 | 0.5 | 16 | 100 | 1.0 | 6 | 100 | Example |
| 4 | Mild steel | 0.8 | 5182 | 1.0 | 2.5 | 10 | 500 | 2.0 | 4 | 400 | Example |
| 5 | 30 kg High tensile strength steel | 1.2 | 6022 | 1.0 | 1.5 | 18 | 50 | 1.0 | 4 | 600 | Example |
| 6 | 30 kg High tensile strength steel | 1.2 | 5023 | 2.0 | 2.0 | 14 | 300 | 2.5 | 6 | 50 | Example |
| 7 | 60 kg High tensile strength steel | 1.2 | 6022 | 1.0 | 2.5 | 14 | 200 | 2.0 | 6 | 400 | Example |
| 8 | 60 kg High tensile strength steel | 1.5 | 6022 | 1.5 | 3.0 | 16 | 100 | 2.5 | 6 | 200 | Example |
| 9 | 60 kg High tensile strength steel | 1.2 | 5023 | 1.0 | 1.5 | 18 | 50 | 2.0 | 6 | 50 | Example |
| 10 | 60 kg High tensile strength steel | 1.5 | 5023 | 1.0 | 2.0 | 12 | 400 | 3.0 | 3 | 400 | Example |
| 11 | 80 kg GA steel | 1.2 | 6022 | 1.0 | 1.5 | 14 | 100 | 1.5 | 6 | 400 | Example |
| 12 | 80 kg GA steel | 1.2 | 5023 | 1.0 | 3.0 | 18 | 50 | 3.0 | 3 | 500 | Example |
| 13 | 100 kg High tensile strength steel | 1.2 | 6022 | 1.0 | 1.5 | 12 | 40 | 1.5 | 6 | 400 | Example |
| 14 | 100 kg High tensile strength steel | 1.2 | 6022 | 1.5 | 3.5 | 12 | 100 | 2.0 | 3 | 200 | Example |
| 15 | 100 kg High tensile strength steel | 1.2 | 5023 | 1.0 | 2.0 | 18 | 60 | 3.0 | 2 | 350 | Example |
| 16 | 100 kg High tensile strength steel | 1.2 | 5182 | 2.0 | 3.0 | 16 | 40 | 2.0 | 6 | 100 | Example |
| 17 | 100 kg High tensile strength steel | 1.5 | 5023 | 1.0 | 1.5 | 14 | 100 | 2.5 | 6 | 200 | Example |
| 18 | Mild steel | 0.8 | 6022 | 1.0 | 1.5 | 12 | 200 | — | — | — | Comparative example |
| 19 | Mild steel | 0.8 | 6022 | 1.5 | 2.0 | 12 | 200 | 1.5 | 16 | 100 | Comparative example |
| 20 | 30 kg High tensile strength steel | 1.2 | 5023 | 1.0 | 2.5 | 20 | 800 | 1.5 | 8 | 400 | Comparative example |
| 21 | 30 kg High tensile strength steel | 0.8 | 5182 | 1.5 | 4.0 | 10 | 200 | 2.0 | 14 | 200 | Comparative example |
| 22 | 60 kg High tensile strength steel | 1.2 | 6022 | 1.0 | 2.0 | 16 | 100 | — | — | — | Comparative example |
| 23 | 60 kg High tensile strength steel | 1.5 | 5023 | 1.0 | 1.5 | 14 | 200 | 2.0 | 12 | 800 | Comparative example |
| 24 | 80 kg GA steel | 1.2 | 6022 | 1.0 | 2.5 | 16 | 40 | 1.5 | 18 | 400 | Comparative example |
| 25 | 100 kg High tensile strength steel | 1.2 | 6022 | 1.0 | 1.5 | 12 | 200 | 1.5 | 6 | 400 | Comparative example |
| 26 | 100 kg High tensile strength steel | 1.2 | 6022 | 1.0 | 1.5 | 12 | 40 | — | — | — | Comparative example |
| 27 | 100 kg High tensile strength steel | 1.2 | 5023 | 1.0 | 3.5 | 16 | 100 | 2.0 | 14 | 200 | Comparative example |
| 28 | 100 kg High tensile strength steel | 1.5 | 5182 | 1.5 | 2.0 | 20 | 200 | 3.0 | 16 | 40 | Comparative example |

Steel materials and aluminum materials shown in Table 23 were superposed and welded together by spot welding under welding conditions shown in Table 24 and mentioned below. Electrode tips having a shape shown below were used. Results of evaluation of welded joints thus formed are shown in Table 25.

Welder: Single-Phase Rectifier-Type Resistance Spot Welder

Shape of Electrode:

Positive electrode: Dome-shaped 1% Cr—Cu electrode having a rounded end of 7 mm in diameter rounded in 100 mmR Negative electrode: Dome-shaped 1% Cr—Cu electrode having a rounded end of 7 mm in diameter rounded in 100 mmR Radius of dome sphere: 8 mm

TABLE 21

| No. | Cooling rate (° C./s) | Thickness ratio |
|---|---|---|
| 1 | 1910 | 0.83 |
| 2 | 2020 | 0.90 |
| 3 | 1840 | 0.92 |
| 4 | 1970 | 0.91 |
| 5 | 1950 | 0.94 |
| 6 | 2410 | 0.77 |
| 7 | 1770 | 0.68 |
| 8 | 2140 | 0.81 |
| 9 | 2280 | 0.94 |
| 10 | 2090 | 0.65 |
| 11 | 1930 | 0.68 |
| 12 | 2100 | 0.91 |
| 13 | 2200 | 0.85 |
| 14 | 2180 | 0.35 |
| 15 | 2010 | 0.78 |

TABLE 21-continued

| No. | Cooling rate (° C./s) | Thickness ratio |
|---|---|---|
| 16 | 2370 | 0.80 |
| 17 | 2180 | 0.38 |
| 18 | 2600 | 0.60 |
| 19 | 2740 | 0.53 |
| 20 | 2110 | 0.23 |
| 21 | 2680 | 0.48 |
| 22 | 2780 | 0.57 |
| 23 | 2640 | 0.14 |
| 24 | 2810 | 0.47 |
| 25 | 2100 | 0.11 |
| 26 | 2570 | 0.90 |
| 27 | 2740 | 0.21 |
| 28 | 2430 | 0.12 |

TABLE 22

| No. | Cracking | Remarks |
|---|---|---|
| 1 | ○ | Example |
| 2 | ○ | Example |
| 3 | ○ | Example |
| 4 | ○ | Example |
| 5 | ○ | Example |
| 6 | ○ | Example |
| 7 | ○ | Example |
| 8 | ○ | Example |
| 9 | ○ | Example |
| 10 | ○ | Example |
| 11 | ○ | Example |
| 12 | ○ | Example |
| 13 | ○ | Example |
| 14 | ○ | Example |
| 15 | ○ | Example |
| 16 | ○ | Example |
| 17 | ○ | Example |
| 18 | x | Comparative example |
| 19 | x | Comparative example |
| 20 | x | Comparative example |
| 21 | x | Comparative example |
| 22 | x | Comparative example |
| 23 | x | Comparative example |
| 24 | x | Comparative example |
| 25 | x | Comparative example |
| 26 | x | Comparative example |
| 27 | x | Comparative example |
| 28 | x | Comparative example |

TABLE 23

| | | | | Spot welding conditions | | | | | | |
|---|---|---|---|---|---|---|---|---|---|---|
| | | | | First stage | | | Second stage | | | |
| | Fe | | Al | Welding | Welding | Weld | Welding | Welding | Weld | |
| No. | Type | Thickness (mm) | Type | Thickness (mm) | pressure (kN) | current (kA) | time (ms) | pressure (kN) | current (kA) | time (ms) | Remarks |
|---|---|---|---|---|---|---|---|---|---|---|---|
| 29 | Mild steel | 0.8 | 6022 | 1.0 | 2.0 | 16 | 100 | 2.0 | 8 | 280 | Example |
| 30 | Mild steel | 0.8 | 6022 | 1.5 | 3.0 | 22 | 60 | 2.5 | 16 | 400 | Example |
| 31 | 30 kg High tensile strength steel | 1.2 | 6022 | 1.0 | 2.0 | 18 | 40 | 2.5 | 12 | 200 | Example |
| 32 | 60 kg High tensile strength steel | 1.2 | 6022 | 1.0 | 2.5 | 18 | 80 | 2.0 | 10 | 240 | Example |
| 33 | 60 kg High tensile strength steel | 1.2 | 6022 | 1.5 | 3.5 | 24 | 60 | 3.5 | 14 | 200 | Example |
| 34 | 80 kg High tensile strength steel | 1.2 | 6022 | 1.0 | 3.0 | 22 | 40 | 3.0 | 12 | 320 | Example |
| 35 | 100 kg High tensile strength steel | 1.2 | 6022 | 1.5 | 4.0 | 28 | 40 | 3.5 | 18 | 200 | Example |
| 36 | Mild steel | 0.8 | 6022 | 1.0 | 2.0 | 16 | 80 | — | — | — | Comparative example |
| 37 | Mild steel | 0.8 | 6022 | 1.5 | 3.0 | 20 | 120 | 2.5 | 26 | 120 | Comparative example |
| 38 | 30 kg High tensile strength steel | 1.2 | 6022 | 1.0 | 2.5 | 20 | 400 | 2.5 | 16 | 400 | Comparative example |
| 39 | 60 kg High tensile strength steel | 1.2 | 6022 | 1.0 | 3.0 | 22 | 80 | — | — | — | Comparative example |
| 40 | 60 kg High tensile strength steel | 1.2 | 6022 | 1.5 | 3.5 | 22 | 80 | 3.0 | 12 | 800 | Comparative example |
| 41 | 80 kg GA steel | 1.2 | 6022 | 1.0 | 3.0 | 18 | 40 | 3.0 | 24 | 200 | Comparative example |
| 42 | 100 kg High tensile strength steel | 1.2 | 6022 | 1.0 | 3.5 | 26 | 200 | 3.0 | 18 | 400 | Comparative example |

Steel materials and aluminum materials shown in Table 26 were superposed and welded together by spot welding under welding conditions shown in Table 27 and mentioned below. Electrode tips having a shape shown below were used. Results of evaluation of welded joints thus formed are shown in Table 28.

Welder: Single-Phase Rectifier-Type Resistance Spot Welder

Shape of Electrode:

Positive electrode: Dome-shaped 1% Cr—Cu electrode having a rounded end of 7 mm in diameter rounded in 150 mmR Negative electrode: Dome-shaped 1% Cr—Cu electrode having a rounded end of 7 mm in diameter rounded in 150 mmR Radius of dome sphere: 8 mm

TABLE 24

| No. | Cooling rate (° C./s) | Thickness ratio |
|---|---|---|
| 29 | 2030 | 0.71 |
| 30 | 1980 | 0.87 |
| 31 | 2330 | 0.92 |
| 32 | 2160 | 0.82 |
| 33 | 2270 | 0.76 |
| 34 | 2010 | 0.73 |
| 35 | 1960 | 0.89 |
| 36 | 2900 | 0.60 |

TABLE 24-continued

| No. | Cooling rate (° C./s) | Thickness ratio |
|---|---|---|
| 37 | 3130 | 0.36 |
| 38 | 2350 | 0.19 |
| 39 | 2840 | 0.46 |
| 40 | 2760 | 0.12 |
| 41 | 2930 | 0.35 |
| 42 | 2090 | 0.08 |

TABLE 25

| No. | Cracking | Remarks |
|---|---|---|
| 29 | ○ | Example |
| 30 | ○ | Example |
| 31 | ○ | Example |
| 32 | ○ | Example |
| 33 | ○ | Example |
| 34 | ○ | Example |
| 35 | ○ | Example |
| 36 | x | Comparative example |
| 37 | x | Comparative example |
| 38 | x | Comparative example |
| 39 | x | Comparative example |
| 40 | x | Comparative example |
| 41 | x | Comparative example |
| 42 | x | Comparative example |

TABLE 26

| | Fe | | Al | | Spot welding conditions | | | | | | |
|---|---|---|---|---|---|---|---|---|---|---|---|
| | | | | | First stage | | | Second stage | | | |
| No. | Type | Thickness (mm) | Type | Thickness (mm) | Welding pressure (kN) | Welding current (kA) | Weld time (ms) | Welding pressure (kN) | Welding current (kA) | Weld time (ms) | Remarks |
| 43 | Mild steel | 0.8 | 6022 | 1.0 | 3.0 | 18 | 100 | 3.0 | 10 | 280 | Example |
| 44 | Mild steel | 0.8 | 6022 | 1.5 | 4.0 | 24 | 60 | 4.0 | 16 | 400 | Example |
| 45 | 30 kg High tensile strength steel | 1.2 | 6022 | 1.0 | 3.5 | 20 | 80 | 3.0 | 14 | 200 | Example |
| 46 | 60 kg High tensile strength steel | 1.2 | 6022 | 1.0 | 3.5 | 22 | 40 | 3.5 | 14 | 200 | Example |
| 47 | 60 kg High tensile strength steel | 1.2 | 6022 | 1.5 | 4.0 | 24 | 40 | 4.0 | 16 | 160 | Example |
| 48 | 80 kg High tensile strength steel | 1.2 | 6022 | 1.0 | 3.5 | 26 | 40 | 3.5 | 18 | 200 | Example |
| 49 | 100 kg High tensile strength steel | 1.2 | 6022 | 1.5 | 4.5 | 26 | 40 | 4.0 | 20 | 240 | Example |
| 50 | Mild steel | 0.8 | 6022 | 1.0 | 3.0 | 18 | 80 | — | — | — | Comparative example |
| 51 | Mild steel | 0.8 | 6022 | 1.5 | 3.5 | 22 | 120 | 3.0 | 24 | 120 | Comparative example |
| 52 | 30 kg High tensile strength steel | 1.2 | 6022 | 1.0 | 3.0 | 24 | 320 | 3.0 | 16 | 400 | Comparative example |
| 53 | 60 kg High tensile strength steel | 1.2 | 6022 | 1.0 | 3.0 | 24 | 80 | — | — | — | Comparative example |
| 54 | 60 kg High tensile strength steel | 1.2 | 6022 | 1.5 | 3.5 | 28 | 80 | 0.5 | 14 | 400 | Comparative example |
| 55 | 80 kg GA steel | 1.2 | 6022 | 1.0 | 3.0 | 24 | 40 | 3.0 | 16 | 800 | Comparative example |
| 56 | 100 kg High tensile strength steel | 1.2 | 6022 | 1.0 | 4.0 | 28 | 160 | 3.5 | 6 | 320 | Comparative example |

TABLE 27

| No. | Cooling rate (° C./s) | Thickness ratio |
|---|---|---|
| 43 | 1980 | 0.87 |
| 44 | 1950 | 0.92 |
| 45 | 2030 | 0.91 |
| 46 | 2110 | 0.89 |
| 47 | 2240 | 0.92 |
| 48 | 1980 | 0.76 |
| 49 | 2090 | 0.93 |
| 50 | 2860 | 0.78 |
| 51 | 2930 | 0.64 |
| 52 | 2180 | 0.21 |
| 53 | 2750 | 0.78 |
| 54 | 2890 | 0.72 |
| 55 | 2730 | 0.54 |
| 56 | 2070 | 0.26 |

TABLE 28

| No. | Cracking | Remarks |
|---|---|---|
| 43 | ○ | Example |
| 44 | ○ | Example |
| 45 | ○ | Example |
| 46 | ○ | Example |
| 47 | ○ | Example |
| 48 | ○ | Example |
| 49 | ○ | Example |
| 50 | x | Comparative example |
| 51 | x | Comparative example |
| 52 | x | Comparative example |
| 53 | x | Comparative example |
| 54 | x | Comparative example |
| 55 | x | Comparative example |
| 56 | x | Comparative example |

The following facts can be known from Tables 22 to 22. Any cracks were not found in the nuggets of steel-aluminum welded materials in Examples 1 to 17 formed by welding methods meeting conditions specified by the present invention. Cracks were found in the nuggets of steel-aluminum welded materials in comparative examples 18 to 28 formed by welding methods not meeting the specified conditions. it is conjectured that effects intended by the present invention were not exercised and cracks developed in the nuggets because welding methods applied to forming the steel-aluminum welded materials in Comparative examples 18, 22 and 26 supplied welding current in a single-stage current supply pattern and welding methods applied to forming the steel-aluminum welded materials in Comparative examples 19, 21 and 24 supplied welding current in a two-stage current supply pattern specifying a welding current higher than that for the first stage of the two-stage current supply pattern for the second stage of the same.

It is known from data on the steel-aluminum welded materials in Comparative examples 20, 25 and 28 that it is effective in controlling the development of cracks in the nuggets to form the nuggets in a minimum thickness meeting a condition expressed by Expression (1). It is known from data on the steel-aluminum welded materials in Comparative examples 23 and 27 that it is effective in controlling the development of cracks in the nuggets to cool the steel-aluminum welded materials at the recommended cooling rate and to form the nuggets in a minimum thickness meeting a condition expressed by Expression (1).

As obvious from Tables 23 to 25, any cracks did not develop in the nuggets of the steel-aluminum welded materials in Examples 29 to 35 because the welding method specified by the present invention was applied to forming those steel-aluminum welded materials. Cracks developed in the nuggets of the steel-aluminum welded materials in Comparative examples 36 to 42 because those steel-aluminum welded materials do not meet the specified conditions. As obvious from Tables 26 to 28, any cracks did not develop in the nuggets of the steel-aluminum welded materials in Examples 43 to 49 because a welding method specified by the present invention was applied to forming those steel-aluminum welded materials and cracks developed in the nuggets of the steel-aluminum welded materials in Comparative examples 50 to 56 because those steel-aluminum welded materials do not meet the specified conditions.

Figure 14:
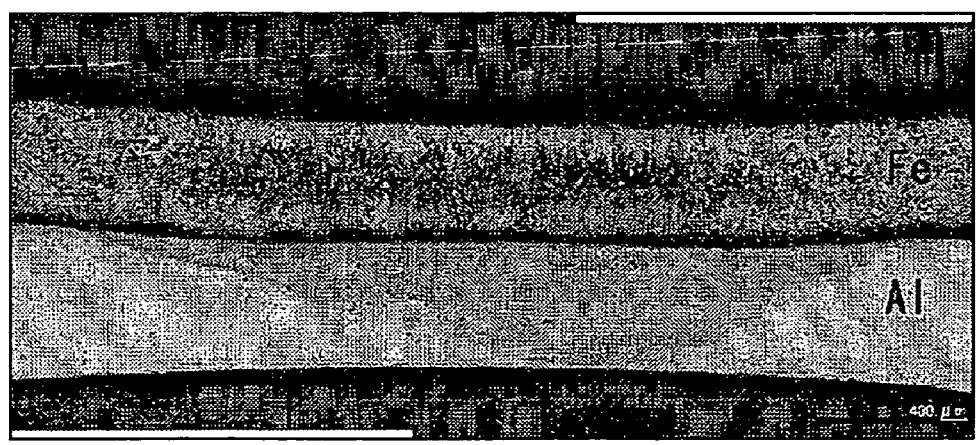
FIG. 14 is a microphotograph of a joint in Example 1 of the present invention.

Microphotographs of sections of joints in the steel-aluminum welded materials according to the present invention are shown by way of example. It is known from the microphotograph of a section of a joint in the steel-aluminum welded material in Comparative example 18 taken at a 25× magnification shown in FIG. 13 that a nugget formed on the side of the aluminum material has cracks. It is known from the microphotograph of a section of a joint in the steel-aluminum welded material in Example 1 taken at a 25× magnification shown in FIG. 14 that a nugget formed on the side of the aluminum material does not have any cracks and the steel and the aluminum material are satisfactorily welded together.

Figure 15:
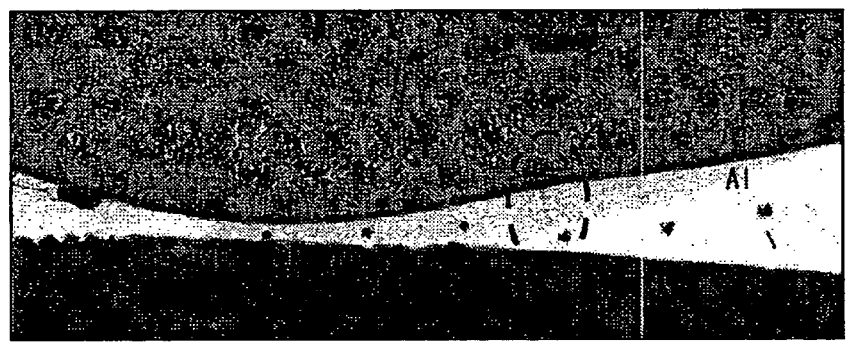
FIG. 15 is a microphotograph of a joint in Example 25 (comparative example)
Figure 16:
FIG. 16 is a microphotograph of a joint in Example 13 of the present invention.

FIG. 15 shows a microphotograph of a section of a joint in the steel-aluminum welded material in Comparative example 25 taken at a 25× magnification. Although a nugget formed in the steel-aluminum welded material in Comparative example 25 was cooled at a low cooling rate, the welding time for the first stage was excessively long. Consequently, the nugget is very thin and cracks are formed in the nugget. FIG. 16 shows a microphotograph of a section of a joint in the steel-aluminum welded material in Example 13 taken with an optical microscope at a 25× magnification. Welding conditions including welding time were controlled so as to form a nugget of a proper thickness in forming the steel-aluminum welded material in Comparative example 13 and hence any cracks did not develop in the nugget of the steel-aluminum welded material in Comparative example 13.

The invention claimed is:

1. A steel-aluminum welded material formed by a process comprising welding together a steel material having a thickness $t_1$ in a range between 0.3 and 2.5 mm and an aluminum material having a thickness $t_2$ in a range between 0.5 and 2.5 mm by spot welding and forming an interface reaction layer comprising intermetallic compounds of $Al_3Fe$ and $Al_{19}Fe_4Si_2Mn$, wherein a nugget formed in spot welded parts has an area in a range between $20\,t_2^{0.5}$ and $70\,t_2^{0.5}$ mm$^2$, and a part of each nugget in a thickness in a range between 0.5 and 10.5 μm of an interface reaction layer has an area not smaller than $10\,t_2^{0.5}$ mm$^2$.

2. The steel-aluminum welded material according to claim 1, wherein the interface reaction layer comprises a compound layer of $Al_5Fe_2$ on the side of the steel material and a compound layer of $Al_3Fe$ and $Al_{19}Fe_4Si_2Mn$ on the side of the aluminum material, and a part of the compound layer of $Al_3Fe$ and $Al_{19}Fe_4Si_2Mn$ in a center of the nugget has a mean thickness along the depth of the nugget in a range between 0.5 and 10 μm.

3. The steel-aluminum welded material according to claim 2, wherein a part of the compound layer of $Al_5Fe_2$ having a mean thickness along the depth of the nuggets in a range between 0.5 and 5 μm has an area of $10\,t_2^{0.5}$ mm$^2$ or above.

4. The steel-aluminum welded material according to claim 2, wherein a part of the compound layer of $Al_5Fe_2$ in a central part of the nugget has a mean thickness along the depth of the nugget in a range between 0.5 and 5 μm.

5. The steel-aluminum welded material according to claim 2, wherein a part having a mean thickness in a range between 0.5 and 10 μm of the compound layer of $Al_3Fe$ and $Al_{19}Fe_4Si_2Mn$ corresponds to a part having a mean thickness in a range between 0.5 and 5 μm of the compound layer of $Al_5Fe_2$ in the interface reaction layer, and the part having a mean thickness in a range between 0.5 and 10 μm of the compound layer of $Al_3Fe$ and $Al_{19}Fe_4Si_2Mn$ has an area of 15 $t_2^{0.5}$ mm² or above.

6. The steel-aluminum welded material according to claim 1, wherein a part having a thickness in a range between 0.5 and 10.5 μm of the interface reaction layer has an area of 25 $t_2^{0.5}$ mm² or above.

7. The steel-aluminum welded material according to claim 1, wherein a middle part of the interface reaction layer has a Mn content 1.5 times the Mn content of the steel material or above and a Si content 1.1 times the Si content of the aluminum material or above and 1.1 times the Si content of the steel material or above.

8. The steel-aluminum welded material according to claim 1, wherein the steel material has a C content in a range between 0.05 and 0.5%, a Mn content in a range between 0.5 and 3% and a Si content in a range between 0.02 and 2.0%.

9. The steel-aluminum welded material according to claim 1, wherein the aluminum material has a Si content in a range between 0.4 and 2%.

10. The steel-aluminum welded material according to claim 1, wherein a remaining part of the aluminum material in a spot welded part has a minimum thickness of 50% or above of the thickness $t_2$.

11. The steel-aluminum welded material according to claim 1, wherein the steel-aluminum welded material without a clad plate is formed by a process comprising welding together a steel material having a thickness $t_1$ in a range between 0.3 and 2.5 mm and an aluminum material having a thickness $t_2$ in a range between 0.5 and 2.5 mm by spot welding and forming an interface reaction layer comprising intermetallic compounds of $Al_3Fe$ and $Al_{19}Fe_4Si_2Mn$, wherein a nugget formed in spot welded parts has an area in a range between 20 $t_2^{0.5}$ and 70 $t_2^{0.5}$ mm², and a part of each nugget in a thickness of 0.5 to 10.5 μm of an interface reaction layer has an area not smaller than 10 $t_2^{0.5}$ mm².

12. The steel-aluminum welded material according to claim 1, wherein a welding time of the spot welding is 100 $t_2^{0.5}$ ms or below.

13. The steel-aluminum welded material according to claim 1, wherein a welding time of the spot welding is in a range of from 20 $t_2^{0.5}$ ms to 80 $t_2^{0.5}$ ms.

14. The steel-aluminum welded material according to claim 1, wherein the joining surface of the steel material or the aluminum material is coated with a deposited film of at least one of Zn and Al deposited by plating and having a thickness in a rage between 3 and 15 μm and a melting point in a range between 350° C. and 950° C.

15. A spot welding method of fabricating the steel-aluminum welded material according to claim 14, comprising welding together a steel material of a thickness $t_1$ in a range between 0.3 and 2.5 mm and an aluminum material of a thickness $t_2$ in a range between 0.5 and 2.5 mm, by electrode tips each having a rounded end of a diameter of 7 mm or above and a radius R of curvature of 75 mm or above, and carrying out a plurality of welding processes comprising at least two spot welding processes differing from each other in at least one of welding current and weld time, wherein one of the two spot welding processes is a high-current spot welding process that applies a pressure in a range between 2 $t_2^{0.5}$ and 4 $t_2^{0.5}$ kN to the superposed steel material and the aluminum material with the electrode tips and supplies a welding current in a range between 15 $t_2^{0.5}$ and 30 $t_2^{0.5}$ kA to form a nugget having an area in a range between 20 $t_2^{0.5}$ and 70 $t_2^{0.5}$ mm² and the other one of the two spot welding processes is a low-current spot welding process, subsequent to the high-current spot welding process, that applies a pressure in a range between 2 $t_2^{0.5}$ and 4 $t_2^{0.5}$ kN to the superposed steel material and the aluminum material with the electrode tips and supplies a welding current in a range between $t_2^{0.5}$ and 10 $t_2^{0.5}$ kA for a weld time in a range between 100 $t_2^{0.5}$ and 1000 $t_2^{0.5}$ ms.

16. A spot welding method of fabricating the steel-aluminum welded material according to claim 1, comprising welding together a steel material having a thickness $t_1$ in a range between 0.3 and 2.5 mm and an aluminum material having a thickness $t_2$ in a range between 0.5 and 2.5 mm by spot welding, by electrode tips each having a rounded end of a diameter of 7 mm or above and a radius R of curvature of 75 mm or above, applying a pressure in a range between 2 $t_2^{0.5}$ and 4 $t_2^{0.5}$ kN to the superposed steel material and the aluminum material with the electrode tips, and supplying a welding current in a range between 15 $t_2^{0.5}$ and 30 $t_2^{0.5}$ kA for 100 $t_2^{0.5}$ ms or below, wherein the steel-aluminum welded material comprises an interface reaction layer comprising intermetallic compounds of $Al_3Fe$ and $Al_{19}Fe_4Si_2Mn$.

17. The spot welding method according to claim 16, wherein each of the electrode tips has a rounded end of a diameter of 7 mm or above and a radius R of curvature of 120 mm or above, a pressure in a range between 2.5 $t_2^{0.5}$ and 4 $t_2^{0.5}$ kN is applied to the superposed steel material and the aluminum material with the electrode tips, and a welding current in a range between 18 $t_2^{0.5}$ and 30 $t_2^{0.5}$ kA is supplied for a time of 100 $t_2^{0.5}$ ms or below.

18. The method according to claim 16, comprising welding together a steel material of a thickness $t_1$ in a range between 0.3 and 2.5 mm and an aluminum material of a thickness $t_2$ in a range between 0.5 and 2.5 mm, wherein a welding current at the end of current supply is lower than a welding current at the start of current supply.

19. The method according to claim 16, wherein the welding current at the end of current supply is controlled in order that the temperature of a nugget formed in the aluminum material drops from 600° C. to 200° C. at a mean cooling rate of 2500° C./s or below, and the smallest thickness of the nugget in a section of a weld zone meets a condition expressed by Expression 1:

(Smallest thickness of the nugget)/(Thickness of the aluminum material) ≧ 0.3        (1).

* * * * *